(12) United States Patent
Nakamura et al.

(10) Patent No.: US 11,249,237 B2
(45) Date of Patent: Feb. 15, 2022

(54) OPTICAL DEVICE, IMAGE DISPLAY DEVICE, AND DISPLAY DEVICE

(71) Applicant: SONY CORPORATION, Tokyo (JP)

(72) Inventors: Masatoshi Nakamura, Kanagawa (JP); Ichiro Tsujimura, Tokyo (JP); Tatsuya Nakatsuji, Kanagawa (JP); Takatoshi Matsuyama, Aichi (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 16/609,546

(22) PCT Filed: Apr. 11, 2018

(86) PCT No.: PCT/JP2018/015247
§ 371 (c)(1),
(2) Date: Oct. 30, 2019

(87) PCT Pub. No.: WO2018/221026
PCT Pub. Date: Dec. 6, 2018

(65) Prior Publication Data
US 2020/0150332 A1 May 14, 2020

(30) Foreign Application Priority Data
May 30, 2017 (JP) .............................. JP2017-106459

(51) Int. Cl.
*F21V 8/00* (2006.01)
*G02B 27/01* (2006.01)
(52) U.S. Cl.
CPC ......... *G02B 6/0035* (2013.01); *G02B 6/0028* (2013.01); *G02B 27/0172* (2013.01); *G02B 2027/0178* (2013.01)

(58) Field of Classification Search
CPC .... G02B 6/0035; G02B 6/0028; G02B 27/01; G02B 27/017; G02B 27/0172; G02B 2027/0178
See application file for complete search history.

(56) References Cited

U.S. PATENT DOCUMENTS 5,076,664 A 12/1991 Migozzi
9,910,284 B1 * 3/2018 Nortrup ................... G02B 5/04
(Continued)

FOREIGN PATENT DOCUMENTS

CA 2017251 A1 11/1990
CA 2442671 A 10/2002
(Continued)

OTHER PUBLICATIONS

International Search Report and Written Opinion of PCT Application No. PCT/JP2018/015247, dated Jul. 10, 2018, 11 pages of ISRWO.

(Continued)

*Primary Examiner* — Thomas A Hollweg
*Assistant Examiner* — Mary A El-Shammaa
(74) *Attorney, Agent, or Firm* — Chip Law Group

(57) ABSTRACT

There is provided an optical device that provides a high quality image. The optical device includes a first light guiding member that has first through sixth surfaces and a first deflecting means. The first, second, and fifth surfaces are opposed to the third, fourth, and sixth surfaces, respectively. The optical device further includes a second light guiding member that has seventh through twelfth surfaces and a second deflecting means. The seventh, eighth, and eleventh surfaces are opposed to the ninth, tenth, and twelfth surfaces, respectively. Light that enters from the fifth surface is totally reflected within the first light guiding member, is deflected by the first deflecting means, is emitted from the (Continued)

third surface, enters the eighth surface, is totally reflected between the seventh surface and the ninth surface, is deflected by the second deflecting means, and is emitted from the seventh surface.

21 Claims, 22 Drawing Sheets

(56) References Cited

U.S. PATENT DOCUMENTS

| | | | |
|---|---|---|---|
| 10,539,787 B2* | 1/2020 | Haddick | G02B 27/0093 |
| 2001/0027125 A1 | 10/2001 | Kiyomatsu et al. | |
| 2003/0076766 A1 | 4/2003 | Nagata et al. | |
| 2004/0130797 A1 | 7/2004 | Leigh Travis | |
| 2008/0094586 A1 | 4/2008 | Yoshikazu | |
| 2009/0015929 A1 | 1/2009 | Dejong et al. | |
| 2012/0306940 A1 | 12/2012 | Machida et al. | |
| 2013/0329301 A1 | 12/2013 | Travis | |
| 2015/0138451 A1 | 5/2015 | Amitai | |
| 2016/0252742 A1* | 9/2016 | Wakabayashi | G02B 27/0103 345/8 |
| 2016/0284129 A1* | 9/2016 | Nishizawa | G06F 3/013 |
| 2017/0090197 A1* | 3/2017 | Tsai | G02B 27/0172 |
| 2017/0343822 A1* | 11/2017 | Border | G02B 27/286 |
| 2018/0329208 A1* | 11/2018 | Masuda | G02B 27/0101 |

FOREIGN PATENT DOCUMENTS

| | | |
|---|---|---|
| CN | 1412752 A | 4/2003 |
| CN | 101730859 A | 6/2010 |
| CN | 102809821 A | 12/2012 |
| CN | 203012240 U | 6/2013 |
| CN | 103869406 A | 6/2014 |
| CN | 104350411 A | 2/2015 |
| CN | 104395815 A | 3/2015 |
| CN | 107290816 A | 10/2017 |
| EP | 0399865 A1 | 11/1990 |
| EP | 1304586 A2 | 4/2003 |
| EP | 1377871 A1 | 1/2004 |
| EP | 2165232 A1 | 3/2010 |
| EP | 2530510 A2 | 12/2012 |
| EP | 2852859 A1 | 4/2015 |
| EP | 2859400 A1 | 4/2015 |
| FR | 2647556 A | 11/1990 |
| GB | 108838 | 5/2001 |
| JP | 03-015815 A | 1/1991 |
| JP | 2001-264681 A | 9/2001 |
| JP | 2003-195019 A | 7/2003 |
| JP | 2004-526202 A | 8/2004 |
| JP | 2005-521099 A | 7/2005 |
| JP | 2010-533316 A | 10/2010 |
| JP | 2012-252091 A | 12/2012 |
| JP | 2015-529833 A | 10/2015 |
| KR | 10-2015-0013815 A | 2/2015 |
| KR | 10-2015-0023712 A | 3/2015 |
| WO | 2002/082168 A1 | 10/2002 |
| WO | 2006/061927 A1 | 6/2006 |
| WO | 2009/009268 A1 | 1/2009 |
| WO | 2013/175465 A1 | 11/2013 |
| WO | 2013/188085 A1 | 12/2013 |

OTHER PUBLICATIONS

Office Action for CN Patent Appln. No. 2021042102536790, dated Apr. 25, 2021, 10 pages of Office Action and 10 pages of English Translation.

* cited by examiner

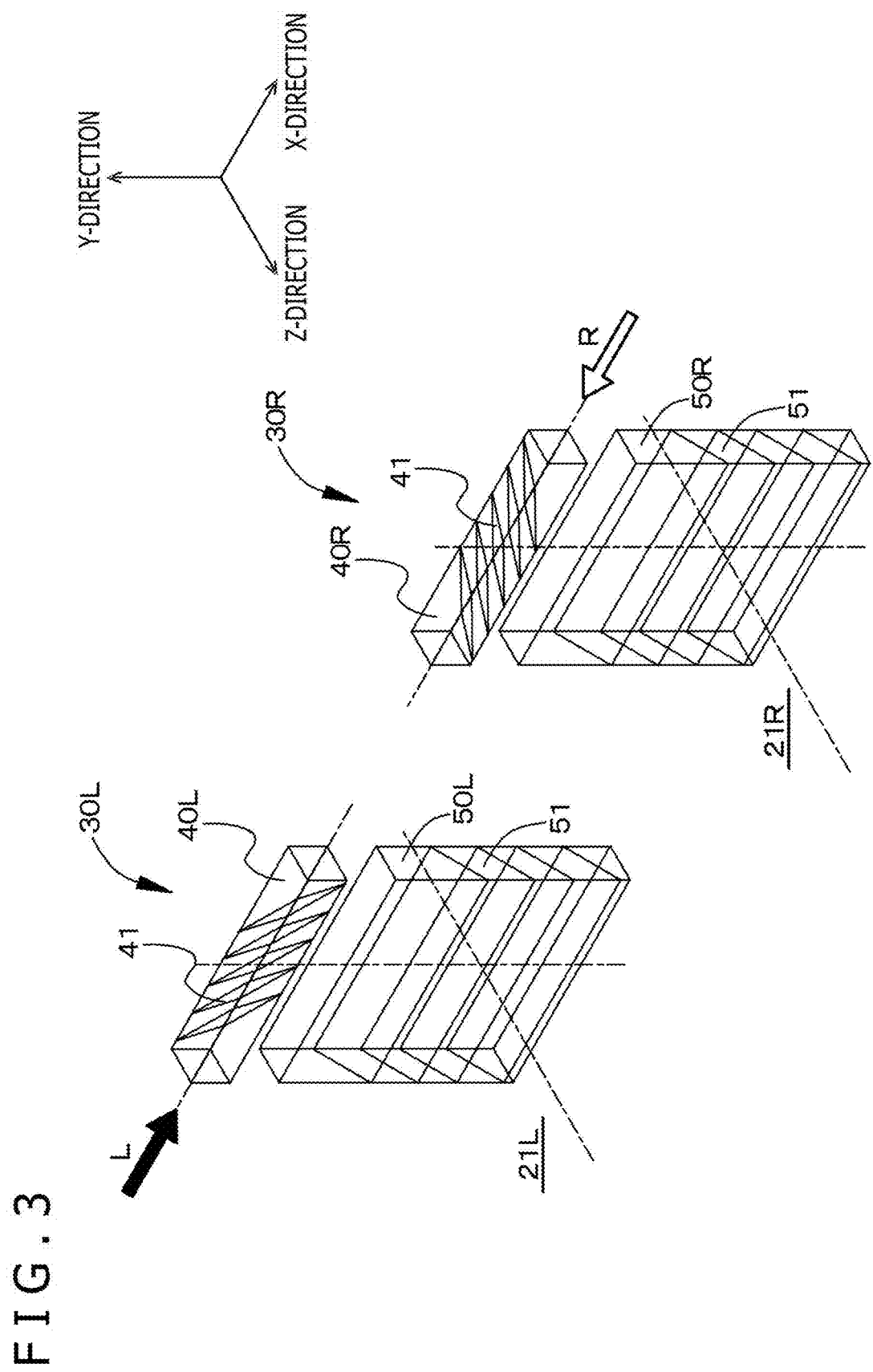

FIG. 5A
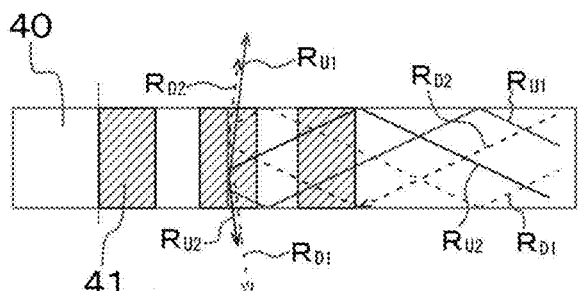
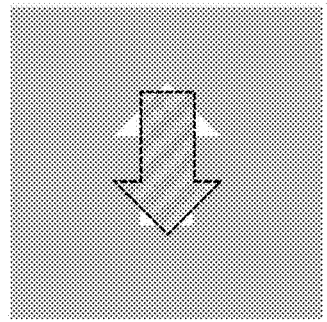
FIG. 5B
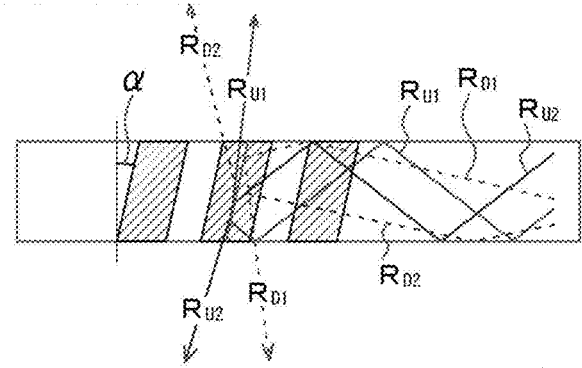
IMAGE
IMAGE RESULTING FROM STRAY LIGHT
FIG. 5C
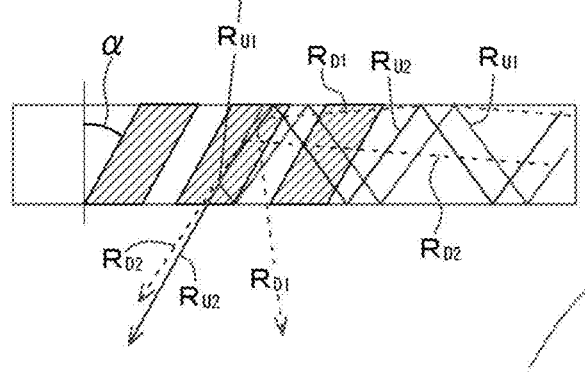
IMAGE
EFFECTIVE VISUAL RECOGNITION REGION
IMAGE RESULTING FROM STRAY LIGHT

EFFECTIVE VISUAL FIELD RANGE

EFFECTIVE VISUAL FIELD RANGE

EFFECTIVE VISUAL FIELD RANGE

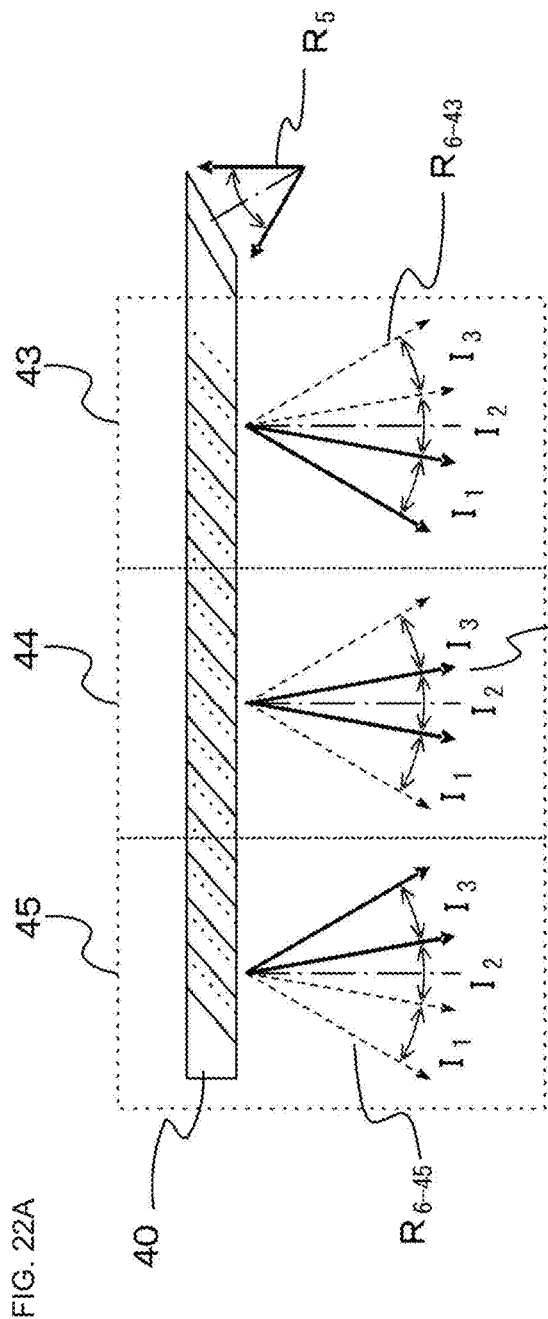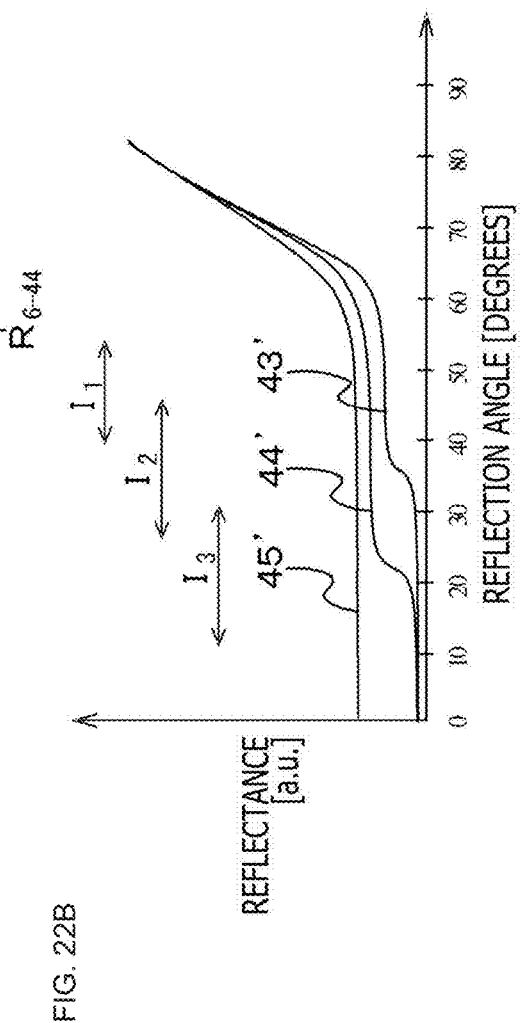
FIG. 22A
FIG. 22B

OPTICAL DEVICE, IMAGE DISPLAY DEVICE, AND DISPLAY DEVICE

CROSS REFERENCE TO RELATED APPLICATIONS

This application is a U.S. National Phase of International Patent Application No. PCT/JP2018/015247 filed on Apr. 11, 2018, which claims priority benefit of Japanese Patent Application No. JP 2017-106459 filed in the Japan Patent Office on May 30, 2017. Each of the above-referenced applications is hereby incorporated herein by reference in its entirety.

TECHNICAL FIELD

The present disclosure relates to an optical device, an image display device including such an optical device, and a display device including such an image display device, and more particularly to a display device for use in a head-mounted display (HMD, Head Mounted Display).

BACKGROUND ART

In recent years, the development of a head-mounted display (HMD) that displays an image from an image forming device on an optical device disposed in front of the eyes of an observer has been earnestly pursued. Then, while head-mounted displays in various forms have been considered, the head-mounted displays are strongly desired to provide a wider angle of view of a display image in order to provide a more realistic image. A head-mounted display in which two deflecting means are arranged on a light guide plate constituting an optical device to address such a desire is well known from FIG. 16 of JP-T-2005-521099, for example. In this head-mounted display, as described in a paragraph number [0059] of the Japanese unexamined patent application publication, an input wave is coupled to the inside of a first LOE 20a by a first reflecting surface 16a and is propagated along a $\xi$-axis. A selective reflecting surface 22a couples light to the outside of 20a, and this light is thereafter coupled to the inside of a second LOE 20b by a second reflecting surface 16b. Then, this light is propagated along an $\eta$-axis, and thereafter coupled to the outside of 20b by a selective reflecting surface 22b.

CITATION LIST

Patent Literature

[PTL 1]
  JP-T-2005-521099

SUMMARY

Technical Problem

However, with the technology disclosed in the above-described Japanese unexamined patent application publication, stray light is included in the light emitted from the first LOE 20a to the second LOE 20b, so that only an image of low image quality is obtained.

Hence, it is an object of the present disclosure to provide an optical device that can provide an image of high image quality, an image display device including such an optical device, and a display device including such an image display device.

Solution to Problem

An optical device according to the present disclosure for achieving the above object includes:

a first light guiding member having a first surface, a second surface, a third surface opposed to the first surface, a fourth surface opposed to the second surface, a fifth surface, and a sixth surface opposed to the fifth surface, and internally including first deflecting means; and a second light guiding member having a seventh surface, an eighth surface, a ninth surface opposed to the seventh surface, a tenth surface opposed to the eighth surface, an eleventh surface, and a twelfth surface opposed to the eleventh surface, and internally including second deflecting means;

the first surface and the third surface being parallel with each other;

the second surface and the fourth surface being parallel with each other and orthogonal to the first surface and the third surface;

the seventh surface and the ninth surface being parallel with an XY plane in an XYZ orthogonal coordinate system;

light entering from the fifth surface being totally reflected within the first light guiding member, being deflected by the first deflecting means, being emitted from the third surface, entering the eighth surface disposed so as to be separated from the third surface, being totally reflected between the seventh surface and the ninth surface, being deflected by the second deflecting means, and being emitted from the seventh surface;

the first deflecting means including a plurality of first semitransparent layers provided so as to be separated from and in parallel with each other;

letting $\alpha$ be an angle formed between a normal to a first semitransparent layer and an X-axis when the normal to the first semitransparent layer is projected onto an XZ plane, a value of $\alpha$ being a value exceeding zero degrees; and letting $\beta$ be an angle formed between the normal to the first semitransparent layer and the X-axis when the normal to the first semitransparent layer is projected onto the XY plane, a value of $\beta$ being a value exceeding zero degrees.

An image display device according to a first mode or a second mode of the present disclosure for achieving the above object includes an image forming device and an optical device, and the optical device includes the above-described optical device according to the present disclosure. Alternatively, the image display device includes an image forming device and the above-described optical device according to the present disclosure.

A display device according to a first mode or a second mode of the present disclosure for achieving the above object includes:

a frame mounted on a head of an observer; and
an image display device attached to the frame;
the image display device including an image forming device and an optical device;
the optical device including the above-described optical device according to the present disclosure.
Alternatively, the display device includes:
a frame mounted on a head of an observer; and
an image display device attached to the frame;
the image display device including an image forming device and the above-described optical device according to the present disclosure.

Advantageous Effect of Invention

In the optical device according to the present disclosure, the optical devices constituting the image display devices according to the first to second modes of the present disclosure, or the optical devices constituting the display devices according to the first to second modes of the present disclosure (these optical devices will hereinafter be referred to collectively as the "optical device according to the present disclosure and the like"), the value of α is a value exceeding zero degrees, and the value of β is also a value exceeding zero degrees. It is therefore possible to suppress (reduce) inclusion of stray light in light (image) emitted from the first light guiding member. As a result, an image of high image quality can be provided. It is to be noted that effects described in the present specification are merely illustrative and are not limited, and there may be additional effects.

BRIEF DESCRIPTION OF DRAWINGS

FIG. 3 is a diagram schematically illustrating the arrangement of the first light guiding member and the second light guiding member when the optical device according to the first embodiment illustrated in FIG. 1 is applied to a binocular display device.

FIGS. 5A, 5B, and 5C are diagrams of assistance in explaining how the formation of an image resulting from stray light changes depending on an angle α.

FIGS. 11B and 11C are schematic sectional views of the first light guiding member and the like.

FIGS. 22A and 22B are diagrams illustrating light emission states in respective areas in a first light guiding member of an optical device according to a fifth embodiment and relation between an angle of reflection and optical reflectance.

DESCRIPTION OF EMBODIMENTS

Figure 1:
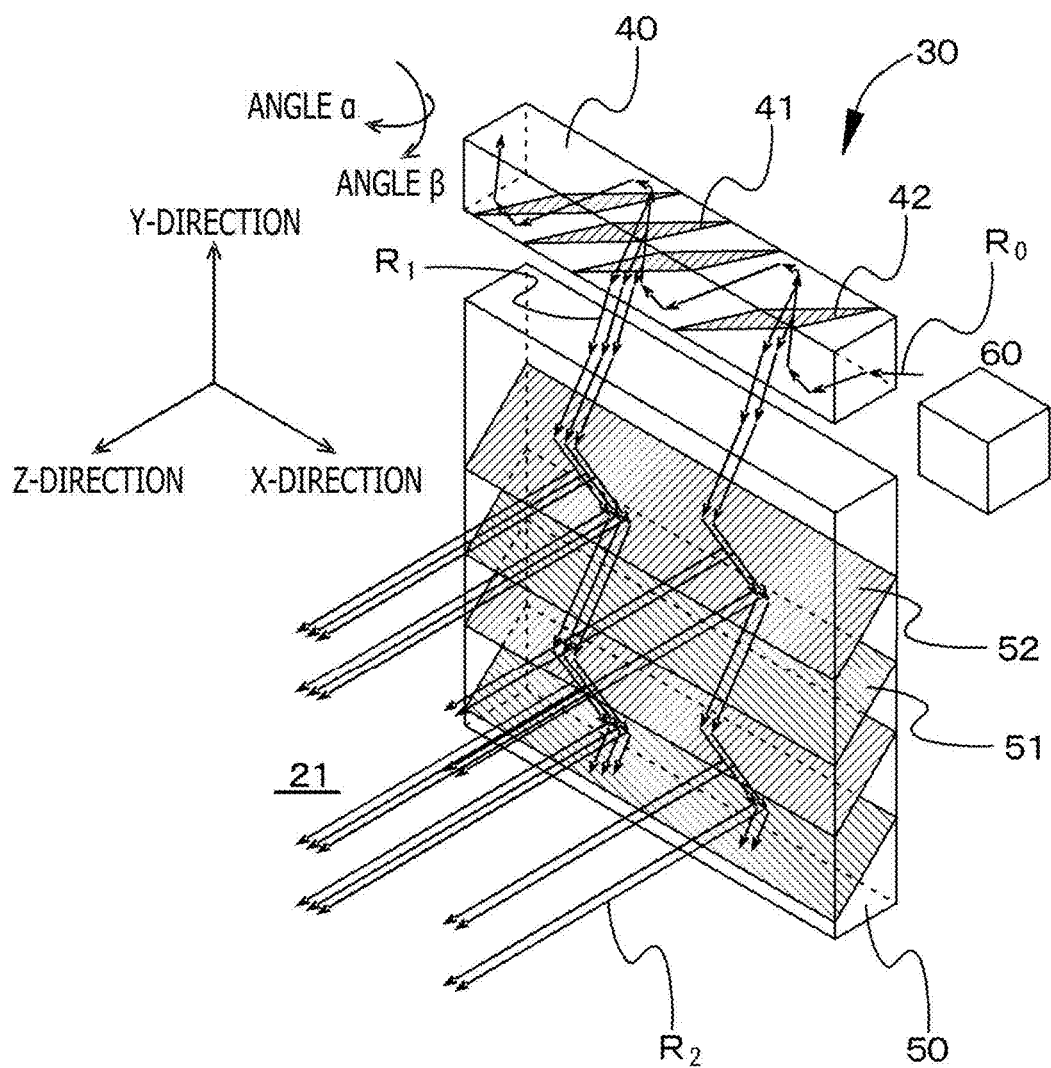
FIG. 1 is a diagram schematically illustrating the arrangement of a first light guiding member and a second light guiding member in an optical device according to a first embodiment together with the behavior of light.

The present disclosure will hereinafter be described on the basis of embodiments with reference to the drawings. However, the present disclosure is not limited to the embodiments, and various numerical values and materials in the embodiments are illustrative. Incidentally, the description will be made in the following order.

1. Optical Device according to Present Disclosure, Image Display Devices according to First to Second Modes of Present Disclosure, Display Devices according to First to Second Modes of Present Disclosure, and General Description 2. First Embodiment (Optical Device according to Present Disclosure, Image Display Devices according to First to Second Modes of Present Disclosure, and Display Devices according to First to Second Modes of Present Disclosure)

3. Second Embodiment (Modification of First Embodiment)
4. Third Embodiment (Modifications of First to Second Embodiments)
5. Fourth Embodiment (Modifications of First to Third Embodiments)
6. Fifth Embodiment (Modifications of First to Fourth Embodiments)
7. Others In an optical device according to the present disclosure and the like, a configuration can be adopted in which a first light guiding member is provided with a semitransparent mirror film provided in parallel with a first surface and a third surface, or a semitransparent mirror film provided in parallel with a second surface and a fourth surface, or a semitransparent mirror film provided in parallel with the first surface and the third surface and a semitransparent mirror film provided in parallel with the second surface and the fourth surface. Then, in this case, a configuration can be adopted in which the semitransparent mirror film provided in parallel with the first surface and the third surface within the first light guiding member is provided in a part of a region located at equal distances from the first surface and the third surface. Alternatively, a configuration can be adopted in which the semitransparent mirror film provided to the first light guiding member so as to be in parallel with the first surface and the third surface is provided in a part of a region on the first surface or a part of a region on the third surface. Alternatively, a configuration can be adopted in which the semitransparent mirror film provided in parallel with the second surface and the fourth surface within the first light guiding member is provided in a part of a region located at equal distances from the second surface and the fourth surface. Alternatively, a configuration can be adopted in which the semitransparent mirror film provided to the first light guiding member so as to be in parallel with the second surface and the fourth surface is provided in a part of a region on the second surface or a part of a region on the fourth surface. Then, thus providing the semitransparent mirror film to the first light guiding member can prevent the occurrence of nonuniformity (light and shade or shading) in an image emitted from the third surface of the first light guiding member. In a case where the semitransparent mirror film is provided in a part of a region on the first surface or a part of a region on the third surface or in a case where the semitransparent mirror film is provided in a part of a region on the second surface or in a part of a region on the fourth surface, a protective member is preferably provided on a surface of the semitransparent mirror film which surface is not in contact with the first light guiding member. It suffices to select the protective member from a material constituting a light guiding member to be described later as appropriate. Incidentally, in either of a case where the semitransparent mirror film is provided and a case where the semitransparent mirror film is not provided, the whole of at least one of the first surface, the second surface, the third surface, or the fourth surface of the first light guiding member is preferably covered with the protective member.

In the optical device according to the present disclosure and the like including the above-described preferable forms and configurations, a configuration can be adopted in which a second light guiding member is provided with a semitransparent mirror film provided in parallel with a seventh surface and a ninth surface. Then, in this case, a configuration can be adopted in which the semitransparent mirror film provided in parallel with the seventh surface and the ninth surface within the second light guiding member is provided in a part of a region located at equal distances from the seventh surface and the ninth surface, or a configuration can be adopted in which the semitransparent mirror film provided to the second light guiding member so as to be in parallel with the seventh surface and the ninth surface is provided in a part of a region on the seventh surface or a part of a region on the ninth surface. Then, thus providing the semitransparent mirror film to the second light guiding member can prevent the occurrence of nonuniformity (light and shade or shading) in an image emitted from the seventh surface of the second light guiding member. In a case where the semitransparent mirror film is provided in a part of a region on the seventh surface or a part of a region on the ninth surface, a protective member is preferably provided on a surface of the semitransparent mirror film which surface is not in contact with the second light guiding member. It suffices to select the protective member from a material constituting a light guiding member to be described later as appropriate. Incidentally, in either of a case where the semitransparent mirror film is provided and a case where the semitransparent mirror film is not provided, the whole of at least one of the seventh surface or the ninth surface of the second light guiding member is preferably covered with the protective member.

In the optical device according to the present disclosure and the like including the various preferable forms and configurations described above, a configuration can be adopted in which a sectional area enlarging portion that enlarges the sectional area of light incident on a fifth surface is provided in the vicinity of the fifth surface in the first light guiding member, and further, in the optical device according to the present disclosure and the like including the various preferable forms and configurations described above, a configuration can be adopted in which a second sectional area enlarging portion that enlarges the sectional area of light incident on an eighth surface is provided in the vicinity of the eighth surface in the second light guiding member. Thus, providing the sectional area enlarging portions can reduce the thickness of the first light guiding member and reduce the thickness of the second light guiding member. Alternatively, the width of a pencil of light rays incident on the first light guiding member can be widened, and the width of a pencil of light rays incident on the second light guiding member can be widened. The sectional area enlarging portions can, for example, be formed by incorporating a prism member in the vicinities of a light incidence portion (fifth surface) of the first light guiding member and a light incidence portion (eighth surface) of the second light guiding member, or the sectional area enlarging portions can be formed by processing a light incidence portion (fifth surface) of the first light guiding member and a light incidence portion (eighth surface) of the second light guiding member into a prism shape. That is, a configuration can be adopted in which the sectional area enlarging portion includes the fifth surface of the prism-shaped first light guiding member, and the second sectional area enlarging portion includes the eighth surface of the prism-shaped second light guiding member. Alternatively, a form can be adopted in which the value of an inclination angle of a light incidence surface of the sectional area enlarging portion (angle formed between a YZ plane and the light incidence surface of the sectional area enlarging portion) is smaller than the value of an inclination angle of the fifth surface of the first light guiding member (angle formed between the YZ plane and the fifth surface) (or is different from the value of the inclination angle of the fifth surface of the first light guiding member), and a form can be adopted in which the value of an inclination angle of the light incidence surface of the second sectional area enlarging portion (angle formed between an XZ plane and the light incidence surface of the second sectional area enlarging portion) is different from the value of an inclination angle of the eighth surface of the second light guiding member (angle formed between the XZ plane and the eighth surface) (or is smaller than the value of the inclination angle of the eighth surface of the second light guiding member). Light emitted from a central portion of an image forming device preferably perpendicularly enters the fifth surface of the first light guiding member (perpendicularly to the light incidence surface of the sectional area enlarging portion in a case where the sectional area enlarging portion is provided). In addition, preferably, the light emitted from the central portion of the image forming device is guided within the first light guiding member, is emitted from the third surface of the first light guiding member, and perpendicularly enters the eighth surface of the second light guiding member (perpendicularly to the light incidence surface of the second sectional area enlarging portion in a case where the second sectional area enlarging portion is provided).

Further, in the optical device according to the present disclosure and the like including the various preferable forms and configurations described above, a form can be adopted in which second deflecting means is formed by providing a plurality of second semitransparent layers in a state of being separated from and in parallel with each other. In this case, a form can be adopted in which first semitransparent layers include a dielectric multilayer film, and the second semitransparent layers include a dielectric multilayer film.

Further, in the optical device according to the present disclosure and the like including the various preferable forms and configurations described above, a form can be adopted in which a first semitransparent layer located at a position far from the fifth surface among the plurality of first semitransparent layers constituting first deflecting means has a higher optical reflectance (lower optical transmittance) than a first semitransparent layer located at a position near the fifth surface. Then, by adopting such a form, it is possible to achieve uniform brightness of an image emitted from the third surface of the first light guiding member. Similarly, a form can be adopted in which a second semitransparent layer located at a position far from the eighth surface among the plurality of second semitransparent layers constituting the second deflecting means has a higher optical reflectance (lower optical transmittance) than a second semitransparent layer located at a position near the eighth surface. Then, by adopting such a form, it is possible to achieve uniform brightness of an image emitted from the seventh surface of the second light guiding member. Alternatively, the first semitransparent layers can be in a form in which relation between an angle (angle of reflection) formed between a normal to a first semitransparent layer and a ray of light reflected by the first semitransparent layer and optical reflectance is defined depending on a distance from the fifth surface. The second deflecting means can be formed by providing a plurality of second semitransparent layers in a state of being separated from and in parallel with each other, and the second semitransparent layers can be in a form in which relation between an angle (angle of reflection) formed between a normal to a second semitransparent layer and a ray of light reflected by the second semitransparent layer and optical reflectance is defined depending on a distance from the eighth surface.

Further, in the optical device according to the present disclosure and the like including the various preferable forms and configurations described above, though not limited, $$20 \text{ (degrees)} \leq \alpha \leq 30 \text{ (degrees) and}$$

$$55 \text{ (degrees)} \leq \beta \leq 65 \text{ (degrees)}$$

are preferably satisfied.

Further, in the optical device according to the present disclosure and the like including the various preferable forms and configurations described above, a configuration can be adopted in which the third surface and the eighth surface are parallel with each other. A form can be adopted in which there is an air layer between the third surface and the eighth surface, or a form can be adopted in which the third surface and the eighth surface are bonded to each other by using an adhesive. In a case where the third surface and the eighth surface are bonded to each other by using an adhesive, the value of a refractive index of a material constituting the adhesive is required to be smaller than the value of a refractive index of a material constituting the first light guiding member such that light propagating within the first light guiding member is totally reflected at an interface between the third surface and the adhesive.

A configuration can be adopted in which the first surface and the third surface of the first light guiding member intersect the XZ plane at an angle of zero degrees, and the second surface and the fourth surface of the first light guiding member intersect an XY plane at an angle of zero degrees. A configuration can be adopted in which the third surface intersects the XZ plane at an angle ($\gamma$) other than zero degrees, and the second surface and the fourth surface intersect the XY plane at an angle ($\gamma$) other than zero degrees.

In the optical device according to the present disclosure and the like including the various preferable forms and configurations described above, collimated light propagated by total reflection within the first light guiding member is reflected (or diffracted) a plurality of times, and is emitted in a state of collimated light from the first light guiding member. Similarly, the collimated light propagated by total reflection within the second light guiding member is reflected (or diffracted) a plurality of times, and is emitted in a state of collimated light from the second light guiding member.

The first light guiding member and the second light guiding member are fixed to a supporting member with a gap therebetween. That is, a space is provided between these light guiding members and the supporting member 31.

Materials constituting materials constituting the first light guiding member, the second light guiding member, the supporting member, and the protective member can include glass including quartz glass, optical glass such as BK7 or the like, or plastic materials (for example, PMMA, polycarbonate resins, acrylic-based resins, amorphous polypropylene-based resins, and styrene-based resins including an AS resin). The external shape of the first light guiding member can include a bar shape (specifically, a sectional shape when the first light guiding member is cut by an imaginary plane orthogonal to the axis of the first light guiding member is a rectangle). The external shape of the second light guiding member can include the shape of a flat plate (direction normal to a total reflection surface is a thickness direction). It is desirable that the refractive indexes of the materials constituting the first light guiding member and the second light guiding member be equal to or more than 1.5, preferably equal to or more than 1.6. As materials having a refractive index equal to or more than 1.5, BK7, polycarbonate resins, amorphous polypropylene-based resins, and styrene-based resins including an AS resin can be illustrated. As materials having a refractive index equal to or more than 1.6, acrylic-based resins can be illustrated. Incidentally, acrylic-based resins having a refractive index equal to or less than 1.6 are also available.

The first semitransparent layers and the second semitransparent layers can include dielectric multilayer films, half-silvered mirrors, polarization beam splitters, or hologram diffraction grating films. In a case where the first semitransparent layers and the second semitransparent layers include a dielectric multilayer film, dielectric materials constituting the dielectric multilayer film can include, for example, oxides of Si, Mg, Al, Hf, Nb, Zr, Sc, Ta, Ga, Zn, Y, B, Ti, and the like, nitrides (for example, AlN, AlGaN, GaN, BN, and the like), fluorides, or the like. Specifically, $SiO_2$, $TiO_2$, $Nb_2O_5$, $ZrO_2$, $Ta_2O_5$, ZnO, $Al_2O_3$, $HfO_2$, AlN, and the like can be illustrated. Then, a dielectric multilayer film can be obtained by alternately laminating, among these dielectric materials, two or more kinds of dielectric films including dielectric materials having different refractive indexes. For example, a multilayer film of $SiO_2$/SiN, $SiO_2$/$Nb_2O_5$, $SiO_2$/$TiO_2$, $SiO_2$/$ZrO_2$, $SiO_2$/AlN, or the like is preferable. It suffices to select a material constituting each dielectric film, film thickness, the number of laminated layers, the layer number of multilayer films, and the like as appropriate in order to obtain a desired optical transmittance (optical reflectance). The thickness of each dielectric film can be adjusted as appropriate according to a material being used or the like, and is determined by the wavelength λ of incident light and a refractive index no at the wavelength λ of the material being used. Specifically, an odd multiple of $\lambda/(4n_0)$ is preferable. As the number of laminated layers, 2 or more, preferably approximately 5 to 20 can be illustrated. It suffices to form the semitransparent mirror films from the dielectric multilayer films described above.

In the optical device according to the present disclosure and the like including the preferable forms and configurations described above, the optical device is of a semitransparent type (see-through type). Specifically, at least a part (second light guiding member) of the optical device which part faces an eyeball (pupil) of an observer is made semitransparent (see-through), and an outside scene can be viewed through this part of the optical device. Here, the term "semitransparent" used in a sense that a part of incident light is transmitted and a remaining part is reflected, rather than meaning that ½ (50%) of incident light is transmitted or reflected. "Semitransparent" in the semitransparent layers and the semitransparent mirror films is also used in a similar sense.

An image display device or a display device according to the present disclosure can make image display in a single color (for example, a green color), or can make color image display.

In the image display device according to the present disclosure including the various preferable forms and configurations described above or an image display device in the display device according to the present disclosure, a form can be adopted in which the image forming device has a plurality of pixels arranged in a form of a two-dimensional matrix. Incidentally, the configuration of such an image forming device will be referred to as an "image forming device of a first configuration" for convenience.

The image forming device of the first configuration can include, for example: an image forming device including a reflective spatial light modulating device and a light source; an image forming device including a transmissive spatial light modulating device and a light source; and an image forming device including a light emitting element such as an organic EL (Electro Luminescence) element, an inorganic EL element, a light emitting diode (LED), a semiconductor laser element, or the like. Among others, an image forming device including a reflective spatial light modulating device and a light source or an image forming device including an organic EL element is preferable. The spatial light modulating devices can include a light bulb, a transmissive or reflective liquid crystal display device such, for example, as LCOS (Liquid Crystal On Silicon) or the like, and a digital micromirror device (DMD). The light sources can include light emitting elements. Further, the reflective spatial light modulating device can have a configuration including a liquid crystal display device and a polarization beam splitter that reflects a part of light from the light source and guides the part of the light to the liquid crystal display device, and allows a part of light reflected by the liquid crystal display device to pass through and guides the part of the light to an optical system. The light emitting elements constituting the light sources can include a red light emitting element, a green light emitting element, a blue light emitting element, or a white light emitting element. Alternatively, white light may be obtained by mixing the colors of red light, green light, and blue light emitted from a red light emitting element, a green light emitting element, and a blue light emitting element by using a light pipe, and uniformizing luminance. A semiconductor laser element, a solid-state laser, or an LED, for example, can be illustrated as a light emitting element. It suffices to determine the number of pixels on the basis of specifications required of the image display device. As a concrete value of the number of pixels, 320×240, 432×240, 640×480, 1024×768, 1920×1080, or the like can be illustrated.

Alternatively, in the image display device according to the present disclosure including the preferable forms and configurations described above or an image display device in the display device according to the present disclosure, a form can be adopted in which the image forming device includes a light source and scanning means for scanning collimated light emitted from the light source. Incidentally, the configuration of such an image forming device will be referred to as an "image forming device of a second configuration" for convenience.

The light source in the image forming device of the second configuration can include a light emitting element, or specifically, can include a red light emitting element, a green light emitting element, a blue light emitting element, or a white light emitting element. Alternatively, white light may be obtained by mixing the colors of red light, green light, and blue light emitted from a red light emitting element, a green light emitting element, and a blue light emitting element by using a light pipe, and uniformizing luminance. A semiconductor laser element, a solid-state laser, or an LED, for example, can be illustrated as a light emitting element. It suffices to determine the number of pixels (virtual pixels) in the image forming device of the second configuration on the basis of specifications required of the image display device. As a concrete value of the number of pixels (virtual pixels), 320×240, 432×240, 640×480, 1024×768, 1920×1080, or the like can be illustrated. In addition, in a case where color image display is made and the light source includes a red light emitting element, a green light emitting element, and a blue light emitting element, color synthesis is preferably performed by using a cross prism, for example. The scanning means can include MEMS (Micro Electro Mechanical Systems) having a micromirror rotatable in a two-dimensional direction, for example, the micromirror performing horizontal scanning and vertical scanning of light emitted from the light source and a galvanometer mirror.

In the image forming device of the first configuration or the image forming device of the second configuration, light formed as a plurality of pieces of collimated light in an optical system (that is an optical system converting light emitted from the image forming device into collimated light, and which is referred to as a "collimated light emitting optical system" in some cases and is specifically a collimating optical system or a relay optical system, for example) is made incident on the first light guiding member. Such collimated light is desired on the basis of a need for optical wavefront information when these pieces of light enter the first light guiding member to be preserved even after being emitted from the second light guiding member via the first deflecting means and the second deflecting means. Incidentally, in order to generate the plurality of pieces of collimated light, specifically, it suffices to position, for example, a light emitting portion of the image forming device at a place (position) of a focal length in the collimated light emitting optical system, for example. The collimated light emitting optical system has a function of converting pixel position information into angle information in the optical system of the optical device. As the collimated light emitting optical system, an optical system having a positive optical power as a whole which optical system uses a convex lens, a concave lens, a free-form surface prism, or a hologram lens singly or in combination can be illustrated. A light shielding unit having an opening portion may be disposed between the collimated light emitting optical system and the first light guiding member to prevent undesired light from being emitted from the collimated light emitting optical system and entering the first light guiding member. In addition, a light shielding unit having an opening portion may be disposed between the first light guiding member and the second light guiding member to prevent undesired light of light emitted from the first light guiding member from entering the second light guiding member.

In the display device according to the present disclosure, a configuration can be adopted in which a frame includes a front portion disposed in front of an observer and two temple portions rotatably attached to both ends of the front portion via a hinge. Incidentally, an end cover portion is attached to an end portion of each of the temple portions. The image display device is attached to the frame. Specifically, it suffices to attach the image forming device to the temple portions, for example. In addition, a configuration in which the front portion and the two temple portions are integral with each other can also be adopted. That is, when the whole of the display device according to the present disclosure is viewed, the frame substantially has substantially the same structure as ordinary eyeglasses. A material constituting the frame including pad portions can include the same material as a material constituting ordinary eyeglasses, such as a metal, an alloy, a plastic, or a combination thereof. Further, a configuration can be adopted in which nose pads are attached to the front portion. That is, when the whole of the display device according to the present disclosure is viewed, an assembly of the frame (including a rim) and the nose pads has substantially the same structure as ordinary eyeglasses. The nose pads can also have a well-known configuration and structure.

In addition, in the display device according to the present disclosure, from a viewpoint of design or ease of mounting, a form is preferable in which wiring (a signal line, a power supply line, or the like) from one or two image forming devices is extended from the end portion(s) of the end cover portion(s) to the outside via the inside(s) of the temple portion(s) and the end cover portion(s), and connected to a control device (a control circuit or control means). Further, a form can be adopted in which each image forming device includes a headphone unit, and wiring for the headphone unit from each image forming device is extended from the end portion of the end cover portion to the headphone unit via the inside of the temple portion and the end cover portion. The headphone unit can include an in-ear type headphone unit or a canal type headphone unit, for example. More specifically, a form is preferable in which the wiring for the headphone unit is extended from the end portion of the end cover portion to the headphone unit so as to circle around the rear side of a pinna (auricle). In addition, a form can be adopted in which an imaging device is attached to a central part of the front portion. The imaging device specifically includes, for example, a solid-state imaging element including a CCD or CMOS sensor and a lens. It suffices to connect wiring from the imaging device to one image display device (or one image forming device) via the front portion, for example, and further include the wiring from the imaging device in wiring extending from the image display device (or the image forming device).

The image display device may include a dimming device. That is, the second light guiding member may overlap at least a part of the dimming device.

A form can be adopted in which the dimming device specifically includes:

a first substrate;

a second substrate opposed to the first substrate;

a first transparent electrode disposed on an opposed surface of the first substrate opposed to the second substrate;

a second transparent electrode disposed on an opposed surface of the second substrate opposed to the first substrate; and a dimming layer sandwiched between the first transparent electrode and the second transparent electrode.

Incidentally, during operation of the dimming device, during operation of the dimming device, a voltage higher than that of the second transparent electrode, for example, is applied to the first transparent electrode.

A form can be adopted in which the dimming layer includes an optical shutter to which a color change in substance which change occurs due to oxidation-reduction reaction of an inorganic or organic electrochromic material is applied. Specifically, a form can be adopted in which the dimming layer includes an inorganic or organic electrochromic material. Further, a form can be adopted in which the dimming layer has a laminated structure of inorganic electrochromic material layers such as $WO_3$ layer/$Ta_2O_5$ layer/$Ir_xSn_{1-x}O$ layer from the first transparent electrode side or a laminated structure of inorganic electrochromic material layers such as $WO_3$ layer/$Ta_2O_5$ layer/$IrO_X$ layer. An $MoO_3$ layer or a $V_2O_5$ layer can be used in place of the $WO_3$ layer. In addition, in place of the lrOx layer, a $ZrO_2$ layer or a zirconium phosphate layer can be used, or a Prussian blue complex/nickel-substituted Prussian blue complex or the like can also be used. Electrochromic materials disclosed in Japanese Patent Laid-Open No. 2014-111710 and Japanese Patent Laid-Open No. 2014-159385, for example, can be used as an organic electrochromic material.

Alternatively, a form can be adopted in which the dimming layer includes an electrophoretic dispersion liquid, and a form can be adopted in which the dimming device is an optical shutter based on an electrodeposition system (electrodeposition or electric field deposition) to which an electrodeposition-dissociation phenomenon occurring due to reversible oxidation-reduction reaction of a metal (for example, silver particles) is applied, that is, the dimming layer includes an electrolyte including metal ions.

Here, the electrophoretic dispersion liquid includes a large number of charged electrophoretic particles and a dispersion medium of a color different from that of the electrophoretic particles. For example, in a case where patterning is performed on the first transparent electrode and patterning is not performed on the second transparent electrode (so-called solid electrode configuration), and the electrophoretic particle is negatively charged, when a relatively negative voltage is applied to the first transparent electrode, and a relatively positive voltage is applied to the second transparent electrode, the electrophoretic particles charged negatively migrate so as to cover the second transparent electrode. Hence, a light shielding rate in the dimming device is a high value. On the other hand, conversely, when a relatively positive voltage is applied to the first transparent electrode, and a relatively negative voltage is applied to the second transparent electrode, the electrophoretic particles migrate so as to cover the first transparent electrode. Hence, the light shielding rate in the dimming device is a low value. The light shielding rate in the dimming device can be controlled by performing the application to such transparent electrodes appropriately. The voltages may be direct-current voltages, or may be alternating-current voltages. It suffices for the shape of the patterned first transparent electrode to be a shape such that the value of the light shielding rate in the dimming device can be optimized when the electrophoretic particles migrate so as to cover the first transparent electrode and the light shielding rate in the dimming device becomes a low value. It suffices to determine the shape of the patterned first transparent electrode by performing various tests. An insulating layer may be formed on the transparent electrodes as required. A material constituting such an insulating layer can, for example, include colorless and transparent insulative resins, and can specifically include, for example, acrylic-based resins, epoxy-based resins, fluorine-based resins, silicone-based resins, polyimide-based resins, polystyrene-based resins, and the like.

Materials constituting the transparent first substrate and the transparent second substrate constituting the dimming device can specifically include transparent glass substrates such as soda-lime glass, white glass plates, and the like, plastic substrates, plastic sheets, and plastic films. Here, plastics can include polyethylene terephthalate, polyethylene naphthalate, polycarbonate, cellulose ester such as cellulose acetate or the like, fluorine-based polymers such as a copolymer of polyvinylidene fluoride or polytetrafluoroethylene and hexafluoropropylene or the like, polyether such as polyoxymethylene or the like, polyacetal, polystyrene, polyethylene, polypropylene, polyolefin such as a methylpentene polymer or the like, polyimide such as polyamidimide, polyetherimide, or the like, polyamide, polyethersulfone, polyphenylene sulfide, polyvinylidene fluoride, tetraacetylcellulose, brominated phenoxy, polyarylate, polysulfone, and the like. The plastic sheets and the plastic films may have rigidity so as not to be bent easily, or may have flexibility. In a case where the first substrate and the second substrate include a transparent plastic substrate, a barrier layer including an inorganic material or an organic material may be formed in an inner surface of the substrate.

The first substrate and the second substrate are sealed by a sealing member and are bonded to each other at outer edge portions. Various kinds of resins of a thermosetting type, a photocuring type, a moisture curing type, an anaerobic curing type, and the like such as epoxy-based resins, urethane-based resins, acrylic-based resins, vinyl acetate-based resins, ene-thiol-based resins, silicone-based resins, modified polymer resins, and the like can be used as the sealing member, which is referred to also as a sealing agent.

When a configuration is adopted in which one of the substrates constituting the dimming device doubles as the second light guiding member, the weight of the display device as a whole can be decreased, and therefore there is no fear of causing an uncomfortable feeling to a user of the display device.

The first transparent electrode may be patterned, or may not be patterned. The second transparent electrode may be patterned, or may not be patterned. Materials constituting the first transparent electrode and the second transparent electrode can specifically include indium-tin complex oxides (including ITO, Indium Tin Oxide, Sn-doped $In_2O_3$, crystalline ITO, and amorphous ITO), fluorine-doped $SnO_2$ (FTO), IFO (F-doped $In_2O_3$), antimony-doped $SnO_2$ (ATO), $SnO_2$, ZnO (including Al-doped ZnO and B-doped ZnO), indium-zinc complex oxides (IZO, Indium Zinc Oxide), spinel-type oxides, oxides having a $YbFe_2O_4$ structure, conductive polymers such as polyaniline, polypyrrole, and polythiophene, and the like. However, the materials are not limited to these materials, and two or more kinds of these materials can be used in combination with each other. The first transparent electrode and the second transparent electrode can be formed on the basis of physical vapor deposition methods (PVD methods) such as a vacuum evaporation method, a sputtering method, and the like, various kinds of chemical vapor deposition methods (CVD methods), various kinds of coating methods, and the like. Patterning can be performed by an arbitrary method such as an etching method, a lift-off method, methods using various kinds of masks, or the like.

A form can be adopted in which the dimming device is provided to the front portion. Then, in this case, a form can be adopted in which: the front portion has a rim; and the dimming device is fitted in the rim. In addition, in the display device according to the present disclosure including the various preferable forms described above, the second light guiding member and the dimming device may be arranged in this order from the observer side, or the dimming device and the second light guiding member may be arranged in this order from the observer side.

A form can be adopted in which: an illuminance sensor (ambient illuminance measuring sensor) that measures the illuminance of an environment in which the display device is placed is further included; and the light shielding rate of the dimming device is controlled on the basis of a result of measurement of the illuminance sensor (ambient illuminance measuring sensor). Alternatively, a form can be adopted in which: an illuminance sensor (ambient illuminance measuring sensor) that measures the illuminance of an environment in which the display device is placed is further included; and the luminance of an image formed by the image forming device is controlled on the basis of a result of measurement of the illuminance sensor (ambient illuminance measuring sensor). These forms may be combined with each other.

Alternatively, a form can be adopted in which a second illuminance sensor that measures illuminance based on light passed through the dimming device from an external environment (which illuminance sensor is referred to as a "transmitted light illuminance measuring sensor" for convenience in some cases) is further included; and the light shielding rate of the dimming device is controlled on the basis of a result of measurement of the second illuminance sensor (transmitted light illuminance measuring sensor). Alternatively, a form can be adopted in which: a second illuminance sensor (transmitted light illuminance measuring sensor) that measures illuminance based on light passed through the dimming device from the external environment is further included; and the luminance of an image formed by the image forming device is controlled on the basis of a result of measurement of the second illuminance sensor (transmitted light illuminance measuring sensor). Incidentally, a form is preferable in which the second illuminance sensor (transmitted light illuminance measuring sensor) is disposed on the observer side of the optical device. At least two second illuminance sensors (transmitted light illuminance measuring sensors) may be arranged, illuminance based on light passed through a part of a high light shielding rate may be measured, and illuminance based on light passed through a part of a low light shielding rate may be measured. These forms may be combined with each other. Further, these forms and the forms in which control is performed on the basis of a result of measurement of the above-described illuminance sensor (ambient illuminance measuring sensor) may be combined with each other.

It suffices to form the illuminance sensors (the ambient illuminance measuring sensors and the transmitted light illuminance measuring sensors) from a well-known illuminance sensor. It suffices to control the illuminance sensors on the basis of a well-known control circuit.

A configuration can be adopted in which a maximum optical transmittance of the dimming device is equal to or higher than 50%, and a minimum optical transmittance of the dimming device is equal to or lower than 30%. Incidentally, 99% can be cited as an upper limit value of the maximum optical transmittance of the dimming device, and 1% can be cited as a lower limit value of the minimum optical transmittance of the dimming device. Here, the following relation holds:

(Optical Transmittance)=1−(Light Shielding Rate)

It suffices to attach a connector to the dimming device (specifically, attach the connector to the first transparent electrode and the second transparent electrode), and electrically connect the dimming device to a control circuit for controlling the light shielding rate of the dimming device (which control circuit is a dimming device and control circuit, and is, for example, included in a control device for controlling the image forming device) via the connector and wiring.

In some cases, a configuration can be adopted in which the dimming device colors the light passed through the dimming device in a desired color. Then, in this case, a form can be adopted in which the color imparted by the dimming device is variable, or a form can be adopted in which the color imparted by the dimming device is fixed. Incidentally, in the former case, a form suffices in which a dimming device imparting a red color, a dimming device imparting a green color, and a dimming device imparting a blue color are laminated, for example. In addition, in the latter case, though the color imparted by the dimming device is not limited, a brown color can be illustrated as the color imparted by the dimming device.

The observer observes the brightness of light passed through the dimming device and the optical device, and the observer can control and adjust the light shielding rate manually by operating a switch, a button, a dial, a slider, a knob, or the like. Alternatively, the light shielding rate can be controlled and adjusted on the basis of a result of measurement of the above-described second illuminance sensor (transmitted light illuminance measuring sensor) that measures illuminance based on light passed through the dimming device from the external environment. Incidentally, to control and adjust the light shielding rate, specifically, it suffices to control voltages applied to the first transparent electrode and the second transparent electrode. At least two second illuminance sensors (transmitted light illuminance measuring sensors) may be arranged, illuminance based on light passed through a part of a high light shielding rate may be measured, and illuminance based on light passed through a part of a low light shielding rate may be measured. The display device may include one image display device, or may include two image display devices. In a case where two image display devices are included, the light shielding rate in one dimming device and the light shielding rate in the other dimming device can be equalized by adjusting voltages applied to the first transparent electrode and the second transparent electrode in each of the one dimming device and the other dimming device. The light shielding rate in the dimming device and the light shielding rate in the other dimming device can, for example, be controlled on the basis of a result of measurement of the above-described second illuminance sensor (transmitted light illuminance measuring sensor) that measures illuminance based on light passed through the dimming device from the external environment. Alternatively, the observer observes the brightness of light passed through the one dimming device and one optical device and the brightness of light passed through the other dimming device and the other optical device, and the observer can manually control and adjust the light shielding rate in the one dimming device and the light shielding rate in the other dimming device by operating a switch, a button, a dial, a slider, a knob, or the like. In a case where the light shielding rates are adjusted, a test pattern may be displayed on the optical devices.

The display device according to the present disclosure can constitute a head-mounted display (HMD), for example. Then, it is thereby possible to achieve a weight reduction and miniaturization of the display device, greatly reduce an uncomfortable feeling at a time of wearing the display device, and further achieve a reduction in manufacturing cost. Alternatively, the image display device according to the present disclosure can be applied to a head-up display (HUD) provided in a vehicle, a cockpit of an aircraft, or the like. Specifically, the HUD can be adopted such that a virtual image forming region in which a virtual image based on light emitted from the image forming device is formed is disposed in the windshield of a vehicle, a cockpit of an aircraft, or the like, or the HUD can be adopted such that a combiner having a virtual image forming region in which a virtual image based on light emitted from the image forming device is formed is disposed in the windshield of a vehicle, a cockpit of an aircraft, or the like.

First Embodiment

Figure 2A:
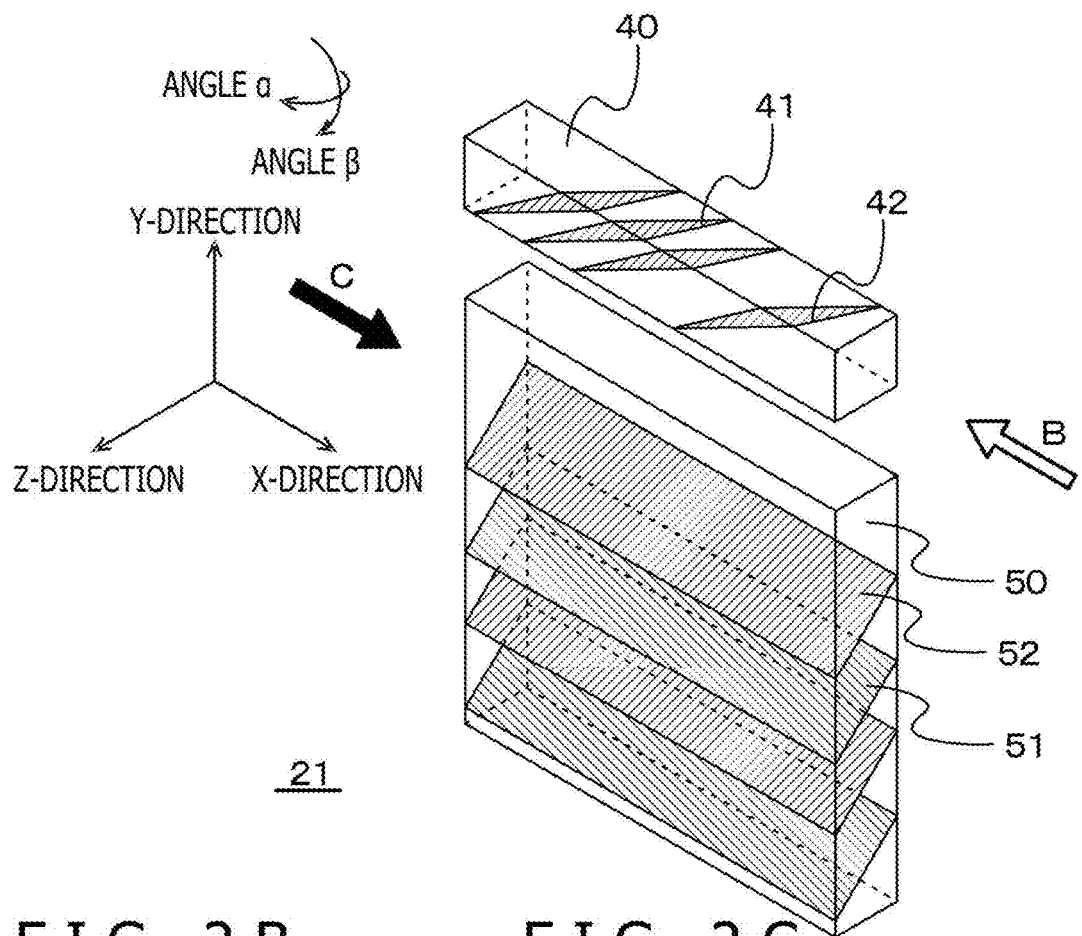
FIG. 2A is a diagram schematically illustrating the arrangement of the first light guiding member and the second light guiding member in the optical device according to the first embodiment illustrated in FIG. 1.
Figure 2B:
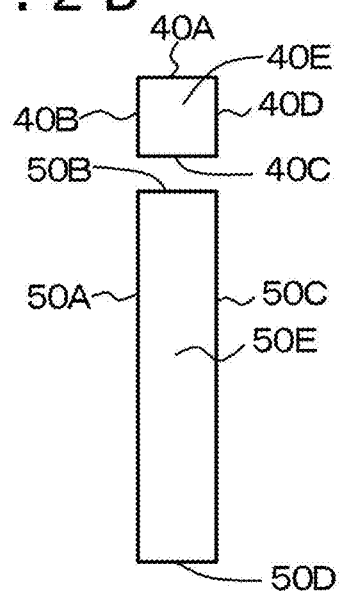
FIG. 2B is a side view of the first light guiding member and the second light guiding member when the first light guiding member and the second light guiding member are viewed from the direction of an outlined arrow in FIG. 2A.
Figure 2C:
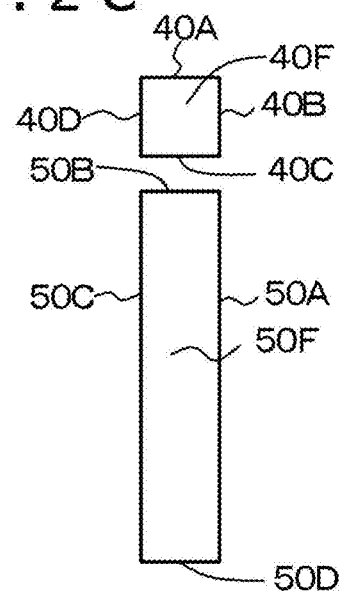
FIG. 2C is a side view of the first light guiding member and the second light guiding member when the first light guiding member and the second light guiding member are viewed from the direction of a black arrow in FIG. 2A.
Figure 4A:
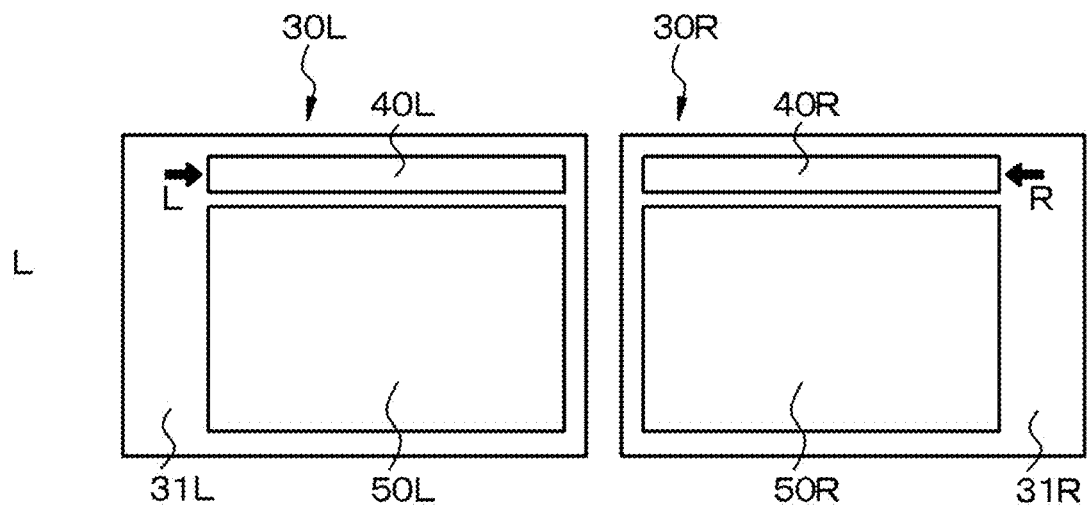
FIGS. 4A and 4B are diagrams schematically illustrating states of arrangement of first light guiding members and second light guiding members in the display device according to the first embodiment and a display device according to a second embodiment.
Figure 4B:
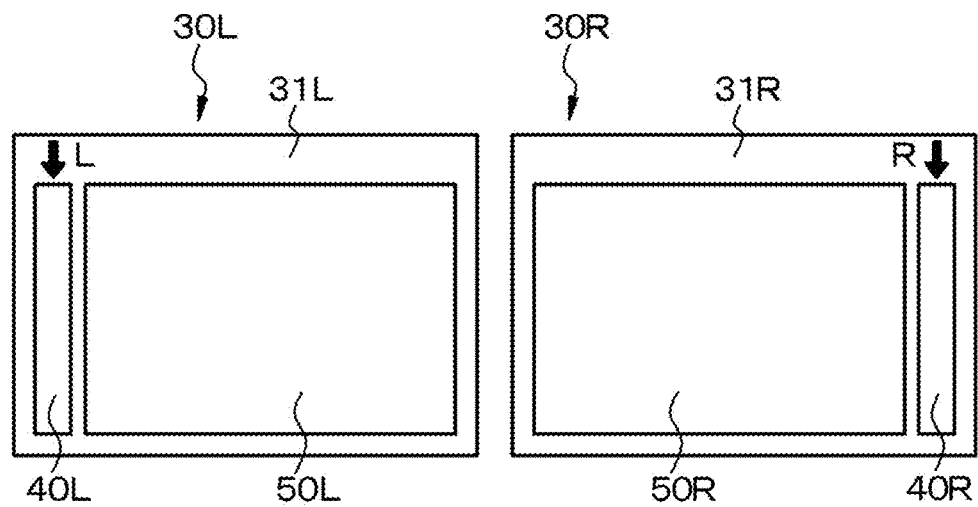
Figure 9:
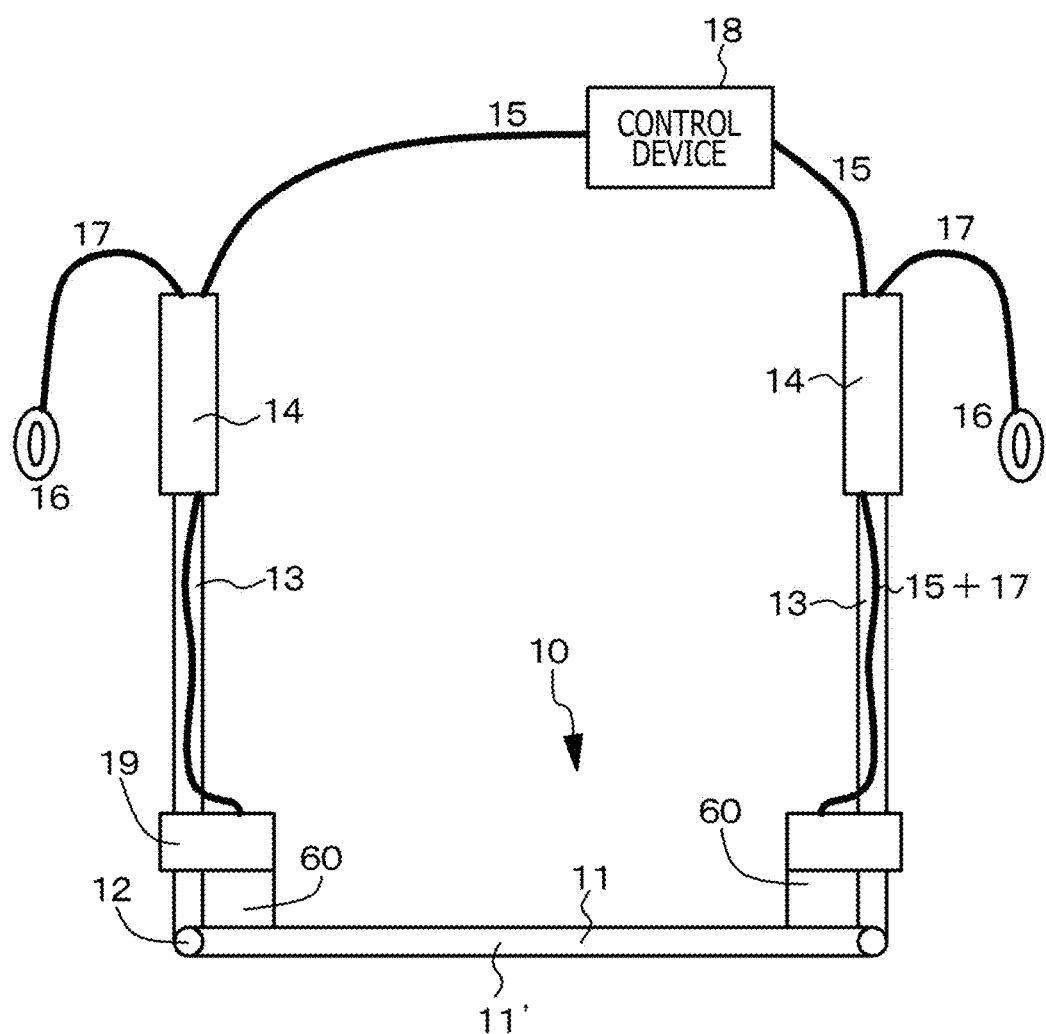
FIG. 9 is a schematic view of the display device according to the first embodiment as viewed from above.
Figure 10:
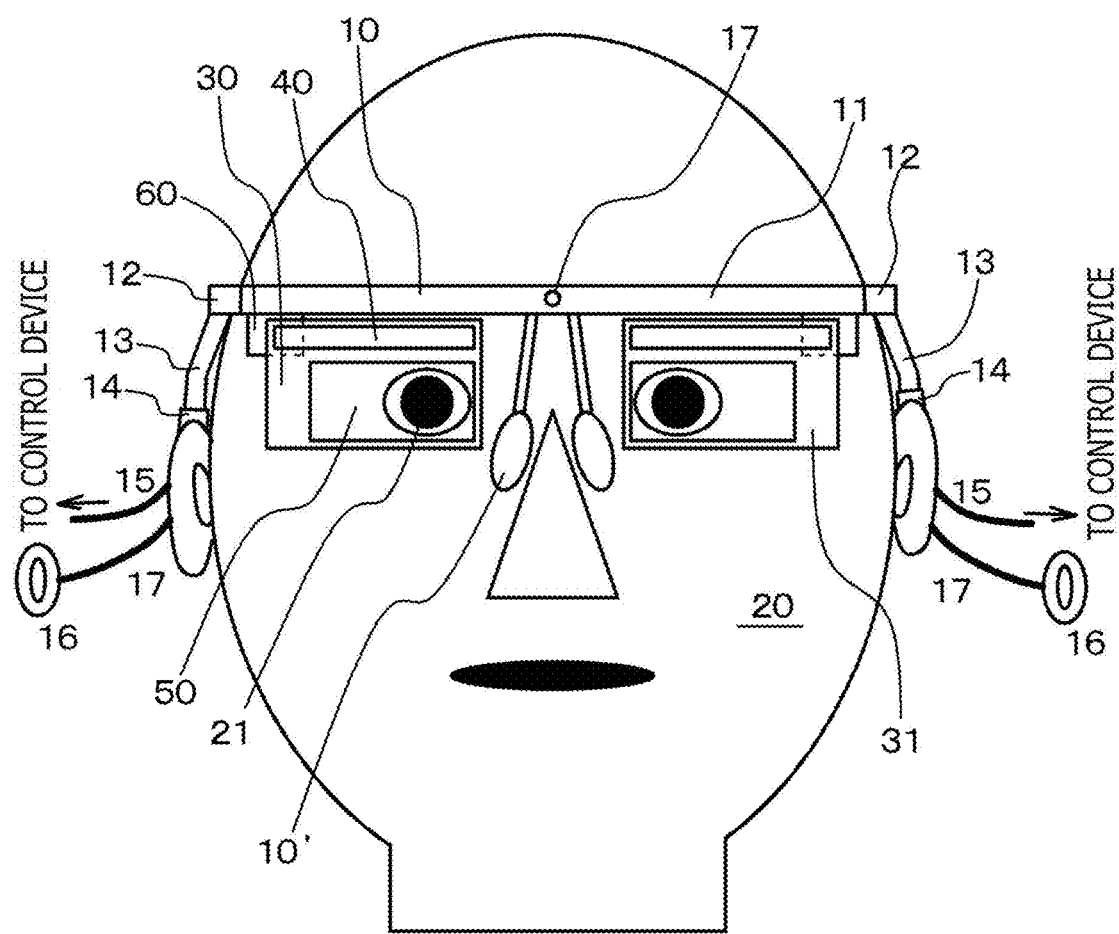
FIG. 10 is a schematic view of the display device according to the first embodiment as viewed from a front.
Figure 11A:
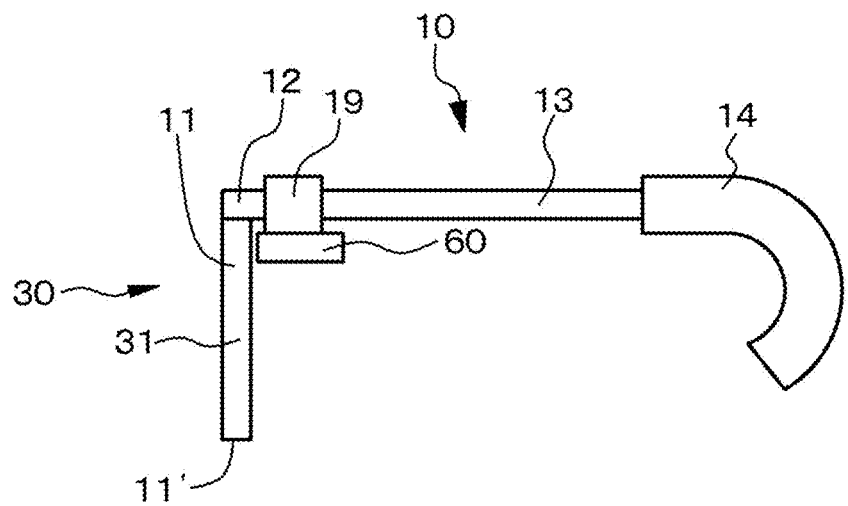
FIGS. 11A and 11D are schematic views of the display device according to the first embodiment and a modification thereof as viewed from a side.
Figures 11B, 11C:
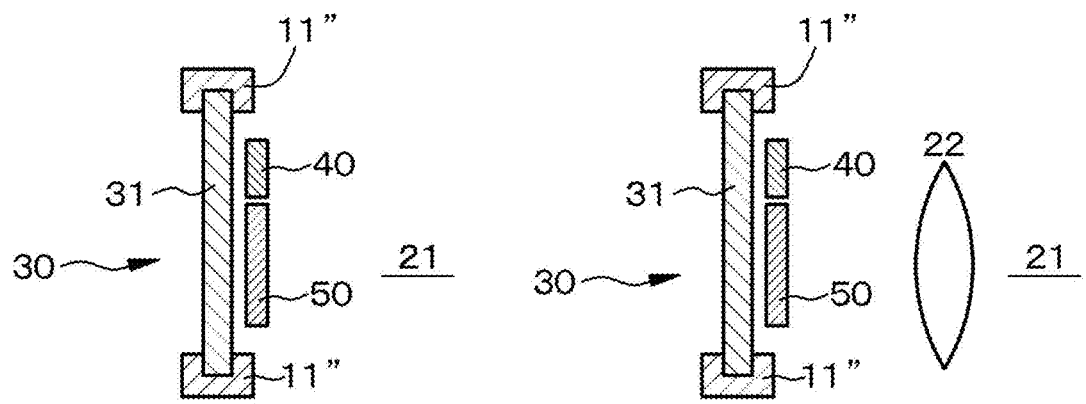

A first embodiment relates to an optical device according to the present disclosure, image display devices according to a first mode to a second mode of the present disclosure, and display devices according to the first to second modes of the present disclosure. FIG. 1 schematically illustrates the arrangement of a first light guiding member and a second light guiding member in an optical device according to the first embodiment together with the behavior of light, an image forming device, and an eye of an observer. FIG. 2A schematically illustrates the arrangement of the first light guiding member and the second light guiding member. In addition, FIGS. 2B and 2C illustrate side views of the first light guiding member and the second light guiding member when the first light guiding member and the second light guiding member are viewed from the directions of an outlined arrow B in FIG. 2A and a black arrow C in FIG. 2A. Further, FIG. 3 schematically illustrates the arrangement of the first light guiding member and the second light guiding member when the optical device according to the first embodiment illustrated in FIG. 1 is applied to a binocular display device. FIG. 4A schematically illustrates a state of arrangement of the first light guiding member and the second light guiding member in a display device according to the first embodiment. In addition, FIG. 9 illustrates a schematic diagram of the display device according to the first embodiment as viewed from above. FIG. 10 illustrates a schematic diagram of the display device according to the first embodiment as viewed from the front. FIG. 11A illustrates a schematic diagram of the display device according to the first embodiment as viewed from a side. FIG. 11B illustrates a schematic sectional view of the first light guiding member and the like. Incidentally, in the drawings, "R" is affixed to the reference numbers of the optical device and the like for a right eye, and "L" is affixed to the reference numbers of the optical device and the like for a left eye.

An optical device 30 according to the first embodiment includes:

a first light guiding member 40 having a first surface 40A, a second surface 40B, a third surface 40C opposed to the first surface 40A, a fourth surface 40D opposed to the second surface 40B, a fifth surface 40E, and a sixth surface 40F opposed to the fifth surface 40E, and internally including first deflecting means 41; and a second light guiding member 50 having a seventh surface 50A, an eighth surface 50B, a ninth surface 50C opposed to the seventh surface 50A, a tenth surface 50D opposed to the eighth surface 50B, an eleventh surface 50E, and a twelfth surface 50F opposed to the eleventh surface 50E, and internally including second deflecting means 51.

Then, the first surface 40A and the third surface 40C are parallel with each other, the second surface 40B and the fourth surface 40D are parallel with each other and orthogonal to the first surface 40A and the third surface 40C, the seventh surface 50A and the ninth surface 50C are parallel with an XY plane in an XYZ orthogonal coordinate system, light entering from the fifth surface 40E (which light is indicated by an outlined arrow R and a black arrow L in some cases) is totally reflected within the first light guiding member 40, is deflected by the first deflecting means 41, is emitted from the third surface 40C, enters the eighth surface 50B disposed so as to be separated from the third surface 40C, is totally reflected between the seventh surface 50A and the ninth surface 50C, is deflected by the second deflecting means 51, and is emitted from the seventh surface 50A, the first deflecting means 41 includes a plurality of first semitransparent layers 42 arranged so as to be separated from and in parallel with each other, letting $\alpha$ be an angle formed between a normal to a first semitransparent layer 42 and an X-axis when the normal to the first semitransparent layer 42 is projected onto an XZ plane, the value of $\alpha$ is a value exceeding zero degrees, and letting $\beta$ be an angle formed between the normal to the first semitransparent layer 42 and the X-axis when the normal to the first semitransparent layer 42 is projected onto the XY plane, the value of $\beta$ is a value exceeding zero degrees.

An image display device according to the first embodiment includes an image forming device 60 and an optical device. The optical device includes the optical device 30 according to the first embodiment. The display device according to the first embodiment is, more specifically, a head-mounted display (HMD). The display device according to the first embodiment includes:

a frame 10 (for example, an eyeglass type frame 10) mounted on a head of an observer 20; and an image display device attached to the frame 10;

the image display device including the image forming device 60 and the optical device, and the optical device including the optical device 30 according to the first embodiment.

The image forming device 60 displays a color image (virtual image) including three primary colors of red, green, and blue, for example. A system including the first light guiding member 40, the second light guiding member 50, and a supporting member 31 fixing these light guiding members is of a semitransparent type (see-through type). Incidentally, a space is provided between these light guiding members and the supporting member 31. While in the embodiment, a binocular type including two image display devices is specifically illustrated, a monocular type including one image display device may also be adopted. The image forming device 60 may be fixedly attached to the frame 10, or may be detachably attached to the frame 10.

Here, the second deflecting means 51 includes a plurality of second semitransparent layers 52 arranged so as to be separated from and in parallel with each other. Then, the first semitransparent layers 42 and the second semitransparent layers include a dielectric multilayer film. Specifically, the dielectric multilayer film has a structure formed by alternately laminating a $SiO_2$ film (refractive index of 1.462) and an $Nb_2O_5$ film (refractive index of 2.378), for example, or has a structure formed by alternately laminating a $SiO_2$ film and a $TiO_2$ film (refractive index of 2.493), for example. Normals to the second semitransparent layers 52 are included in a YZ plane.

In addition, the third surface 40C and the eighth surface 50B are parallel with each other. Light emitted from a central portion of the image forming device 60 preferably perpendicularly enters the fifth surface 40E of the first light guiding member 40. In addition, preferably, the light emitted from the central portion of the image forming device 60 is guided within the first light guiding member 40, is emitted from the third surface 40C of the first light guiding member 40, and perpendicularly enters the eighth surface 50B of the second light guiding member 50.

As illustrated in FIG. 1, an image emitted from the image forming device 60 enters the fifth surface 40E of the first light guiding member 40 with a certain angle. A ray of light emitted from the image forming device 60 and entering the fifth surface 40E of the first light guiding member 40 is indicated by "R0." Light entering the inside of the first light guiding member 40 and traveling (propagating or transmitted) in an X-direction as a whole collides with the first surface 40A, the second surface 40B, the third surface 40C, and the fourth surface 40D of the first light guiding member 40, repeats total reflection at these surfaces 40A, 40B, 40C, and 40D, and travels toward the sixth surface 40F. Then, a part of the light colliding with a first semitransparent layer 42 passes through the first semitransparent layer 42, and a part of the light colliding with the first semitransparent layer 42 is reflected and deflected by the first semitransparent layer 42 and emitted as light rays R1 from the third surface 40C. When the light emitted from the central portion of the image forming device 60 is guided within the first light guiding member 40, is emitted from the third surface 40C of the first light guiding member 40, and enters the second light guiding member 50 from the eighth surface 50B, the light is included in the YZ plane. The collimated luminous flux that has entered the first light guiding member 40 is thus emitted from the third surface 40C. The first light guiding member 40 enlarges (expands) the width of the pencil of light rays in the X-direction. While the light incidence surface (fifth surface 40E) of the first light guiding member 40 is illustrated as a surface perpendicular to the X-axis as a light guiding direction in FIGS. 1, 2A, 3, 4A, 4B, 13, and 14 to simplify the drawings, the light incidence surface (fifth surface 40E) of the first light guiding member 40 is preferably designed to be inclined appropriately according to the arrangement of the whole of the display device and the inclination of the first semitransparent layer 42. That is, while the first surface 40A and the third surface 40C of the first light guiding member 40 are illustrated so as to be included in the XZ plane and the second surface 40B and the fourth surface 40D are illustrated so as to be included in the XY plane in FIGS. 1, 2A, 2B, 2C, 3, 4A, 4B, 10, 11B, 11C, 13, 14, 17A, 17B, and 17C, a configuration can be adopted in which the first surface 40A and the third surface 40C intersect the XZ plane at an angle (y) other than zero degrees, and the second surface 40B and the fourth surface 40D intersect the XY plane at an angle (y) other than zero degrees. A light shielding unit having an opening portion may be disposed between the image forming device 60 and the first light guiding member 40 to prevent undesired light from being emitted from the image forming device 60 and entering the first light guiding member 40.

The light rays R1 emitted from the third surface 40C of the first light guiding member 40 enter the eighth surface 50B of the second light guiding member 50. The light entering the inside of the second light guiding member 50 and traveling in a Y-direction as a whole collides with the seventh surface 50A and the ninth surface 50C of the second light guiding member 50, repeats total reflection at these surfaces 50A and 50C, and travels toward the tenth surface 50D. Then, a part of the light colliding with a second semitransparent layer 52 passes through the second semitransparent layer 52. A part of the light colliding with the second semitransparent layer 52 is reflected and deflected by the second semitransparent layer 52, is emitted as light rays R2 from the seventh surface 50A, and arrives at an eye 21 of the observer 20. The collimated luminous flux entering the second light guiding member 50 is thus emitted from the seventh surface 50A. The second light guiding member 50 enlarges (expands) the width of the pencil of light rays in the Y-direction. Hence, the pencil of incident light rays can be expanded two-dimensionally and extracted by the optical device 30. A light shielding unit having an opening portion may be disposed between the first light guiding member 40 and the second light guiding member 50 to prevent undesired light of the light emitted from the first light guiding member 40 from entering the second light guiding member 50. While the light incidence surface (eighth surface 50B) of the second light guiding member 50 is illustrated as a surface perpendicular to a Y-axis as a light guiding direction in FIGS. 1, 2A, 2B, 2C, 3, 4A, 4B, 10, 11B, 11C, 13, and 14 to simplify the drawings, the light incidence surface (eighth surface 50B) of the second light guiding member 50 is preferably designed to be inclined appropriately according to the arrangement of the whole of the display device and the inclination of the second semitransparent layer 52.

The first light guiding member 40 can be obtained by obtaining a block having a desired thickness and a desired number of first semitransparent layers 42 formed within the block by repeating, a desired number of times, steps of forming a first semitransparent layer 42 on a material constituting a first light guiding member 40 and having a desired thickness (which material will hereinafter be referred to as a "light guiding material" for convenience and, for example, includes a glass material BK7 having a refractive index of 1.517 or an acrylic-based resin having a refractive index of 1.525), laminating a light guiding material having a desired thickness to the first semitransparent layer 42, and forming a first semitransparent layer 42 on the laminated light guiding material, and thereafter cutting out the block such that the angles $\alpha$ and $\beta$ are desired values. The second light guiding members 50 can also be manufactured by a similar method. The first light guiding members 40 have a structure formed by laminating the first semitransparent layers 42 and the light guiding material. The second light guiding members 50 have a structure formed by laminating the second semitransparent layer 52 and the light guiding material.

Means for avoiding stray light by controlling the inclination of the first semitransparent layers 42 will be described in the following. FIGS. 5A, 5B, and 5C schematically illustrate light rays propagating (transmitted) within the first light guiding member 40 when the first light guiding member 40 is viewed from above. Incidentally, $\beta$ is equal to zero degrees in the description based on these drawings.

In the example illustrated in FIG. 5A, the angle $\alpha$ is zero degrees, and light rays (represented by solid lines $R_{U1}$ and $R_{U2}$) at an upper end of an image which light rays propagate in a —X-axis direction and light rays (represented by broken lines $R_D$ and $R_{U2}$) at a lower end of the image include light rays colliding with a first semitransparent layer 42 at a same angle (however, the sign of the angle is positive and negative) due to symmetry of the first light guiding member 40 and the first semitransparent layers 42. At this time, the light rays $R_{U1}$ and $R_{D1}$ corresponding to light rays based on an image signal (which light rays will be referred to as "signal light rays") and the stray light rays $R_{U2}$ and $R_{D2}$ are symmetrically emitted from the first semitransparent layer 42. As a result, in an effective field-of-view region (see a diagram on a right hand side of FIG. 5C), an output image resulting from the signal light rays (which output image is represented by an outlined upward arrow in a diagram on a right hand side of FIG. 5A) and an output image resulting from the stray light (which output image is represented by a gray downward arrow in the diagram on the right hand side of FIG. 5A) are displayed in an overlapping manner as inverted images (mirror images), thus inviting a degradation in quality of a display image.

On the other hand, the angle $\alpha$ is a value exceeding zero degrees in FIG. 5B. Then, the emission directions of the light ray $R_{U1}$ corresponding to a signal light ray and the stray light ray $R_{D2}$ can be separated from each other, and the emission directions of the light ray $R_{D1}$ corresponding to a signal light ray and the stray light ray $R_{U2}$ can be separated from each other. As a result, an output image resulting from the signal light rays (which output image is represented by an outlined upward arrow in a diagram on a right hand side of FIG. 5B) and an output image resulting from the stray light (which output image is represented by a gray right downward arrow in the diagram on the right hand side of FIG. 5B) are displayed so as to be separated from each other. An improvement in quality of the display image can therefore be achieved.

In FIG. 5C, the angle α is a value exceeding zero degrees (however, the angle is larger than that illustrated in FIG. 5B). Then, the emission directions of the light ray $R_{U1}$ corresponding to a signal light ray and the stray light ray $R_{D2}$ can be separated from each other more surely, and the emission directions of the light ray $R_{D1}$ corresponding to a signal light ray and the stray light ray $R_{U2}$ can be separated from each other more surely. As a result, an output image resulting from the signal light rays (which output image is represented by an outlined upward arrow in a diagram on a right hand side of FIG. 5B) and an output image resulting from the stray light (which output image is represented by a gray right downward arrow in the diagram on the right hand side of FIG. 5B) are displayed so as to be separated from each other completely. A further improvement in quality of the display image can therefore be achieved.

Figure 6A:
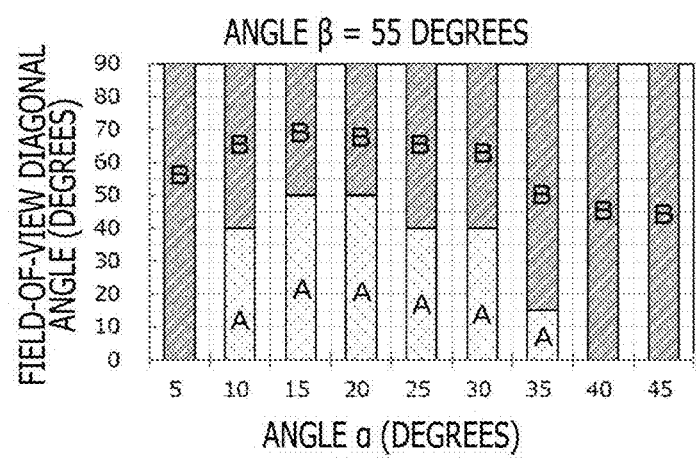
FIGS. 6A and 6B are diagrams illustrating a result of evaluating, as a field-of-view diagonal angle value (unit: degree), an effective field-of-view range emitted from the first light guiding member when the angle α and an angle β are changed in the optical device according to the first embodiment.
Figure 6B:
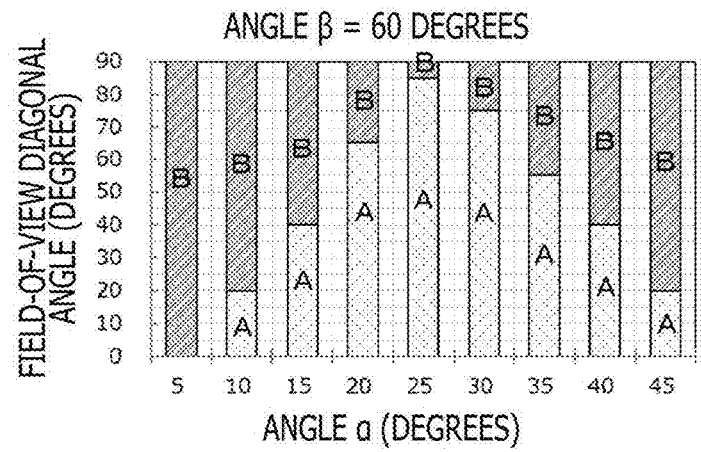
Figure 7A:
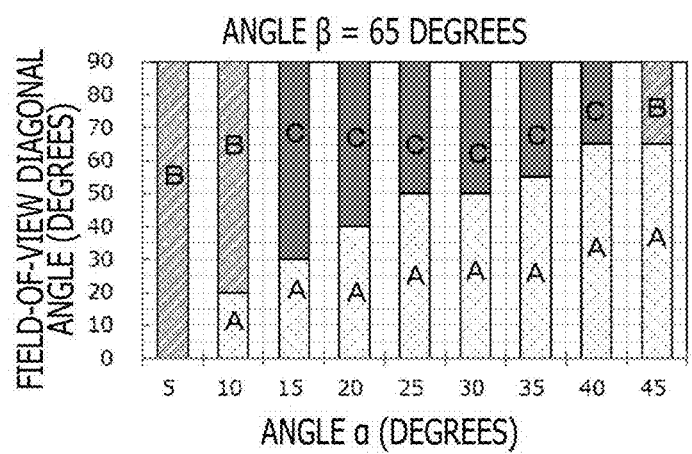
FIGS. 7A and 7B are diagrams illustrating a result of evaluating, as a field-of-view diagonal angle value (unit: degree), an effective field-of-view range emitted from the first light guiding member when the angle α and the angle β are changed in the optical device according to the first embodiment.
Figure 7B:
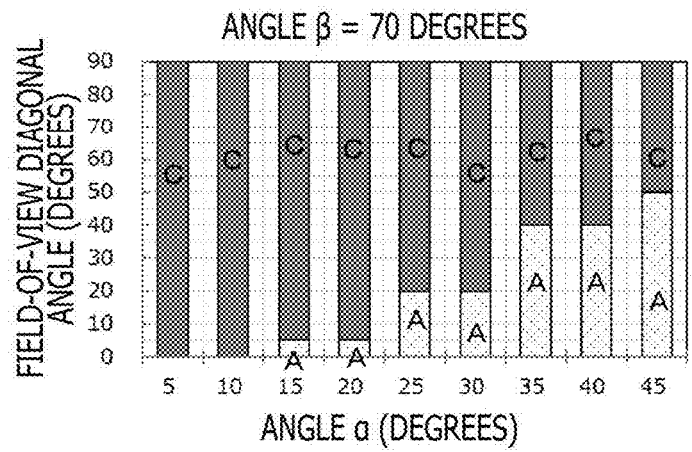

Next, an effective visual field range emitted from the first light guiding member 40 when the angle a and the angle β were changed was evaluated as a field-of-view diagonal angle value (unit: degree) on the basis of simulation. Results of the evaluation are illustrated in FIGS. 6A, 6B, 7A, and 7B. Incidentally, FIG. 6A illustrates a result with β=55 degrees, FIG. 6B illustrates a result with β=60 degrees, FIG. 7A illustrates a result with β=65 degrees, and FIG. 7B illustrates a result with β=70 degrees. Here, in FIGS. 6A, 6B, 7A, and 7B, an axis of ordinates indicates the effective visual field range as a field-of-view diagonal angle value (unit: degree), and an axis of abscissas indicates the angle α (unit: degree). The angle α is changed in steps of five degrees. In addition, in FIGS. 6A, 6B, 7A, and 7B, "A" denotes field-of-view diagonal angle values of the effective field-of-view region, "B" denotes field-of-view diagonal angle values at which stray light occurs, and "C" denotes field-of-view diagonal angle values at which the effective field-of-view region is limited because a total reflection limit of the first light guiding member is exceeded. The wider the region of "A," the larger the field-of-view diagonal angle value of the effective field-of-view region, and the larger field-of-view diagonal angle value is desirable.

As illustrated in FIGS. 6A and 6B, a wide effective visual field range can be secured while stray light is avoided, by adjusting the angle α at each angle β. In particular, a display device providing a wide field of view as a diagonal angle of 60 degrees or more can be realized by selecting the angle β to be 60 degrees, and selecting the angle α to be in a range of 20 degrees to 30 degrees. On the other hand, FIGS. 7A and 7B indicate that from the vicinity of a point where the angle β exceeds 60 degrees, the total reflection limit of the first light guiding member is exceeded, and therefore the effective field-of-view region is limited.

The above results indicate that in the optical device according to the first embodiment, though not limited, 20 (degrees)≤α≤30 (degrees) and 55 (degrees)≤β≤65 (degrees)

are preferably satisfied.

Next, FIGS. 8A, 8B, 8C, 8D, 8E, and 8F illustrate a result of simulation of the effective visual field range emitted from the first light guiding member 40 when the refractive index n of a material constituting the first light guiding member 40 was changed. Here, relation between each diagram of FIGS. 8A, 8B, 8C, 8D, 8E, and 8F and the refractive index and the like is as follows. Incidentally, image light (light for image display) with a diagonal angle of 65 degrees was made incident on the first light guiding member 40.

Figure 8A:
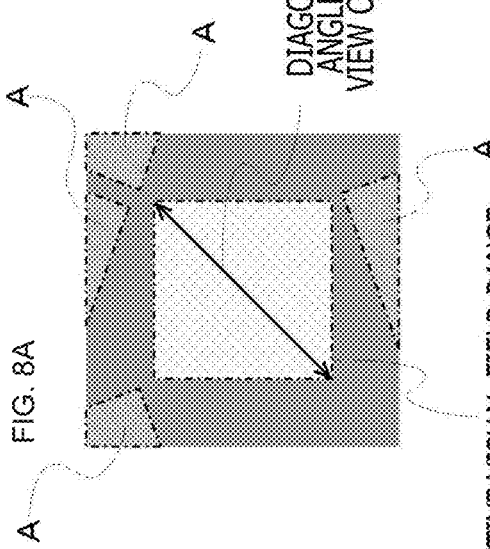
FIGS. 8A, 8B, 8C, 8D, 8E, and 8F are diagrams illustrating a result of evaluating an effective field-of-view range emitted from the first light guiding member when the refractive index n of a material constituting the first light guiding member is changed in the optical device according to the first embodiment.
Figure 8C:
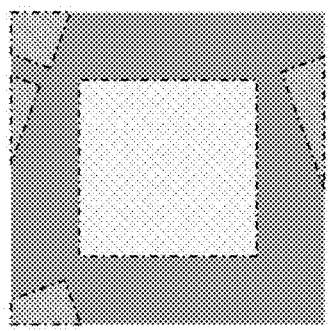
Figure 8E:
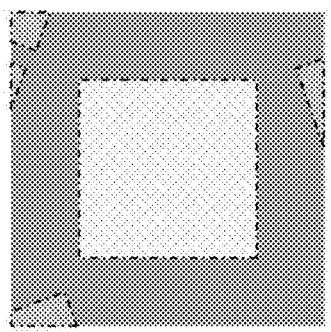
Figure 8B:
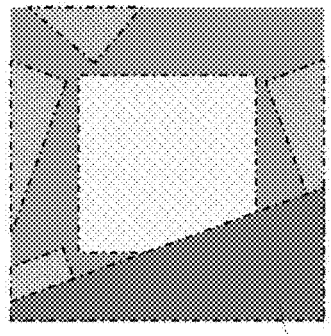
Figure 8D:
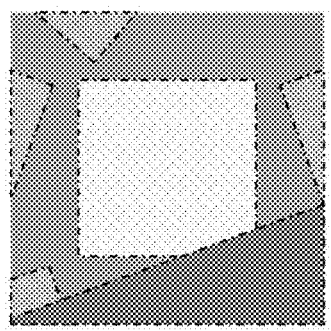
Figure 8F:
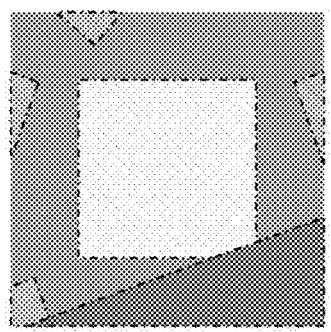

|  | n | α | β |
| --- | --- | --- | --- |
| FIG. 8A | 1.487 | 25 degrees | 60 degrees |
| FIG. 8B | 1.487 | 25 degrees | 65 degrees |
| FIG. 8C | 1.517 | 25 degrees | 60 degrees |
| FIG. 8D | 1.517 | 25 degrees | 65 degrees |
| FIG. 8E | 1.607 | 25 degrees | 60 degrees |
| FIG. 8F | 1.607 | 25 degrees | 65 degrees |

In FIGS. 8A, 8C, and 8E, when the inclination (α, β) of the first semitransparent layer 42 is (25 degrees, 60 degrees), it is found that an output image of stray light (indicated by "A") escapes from the effective visual field range to the outside as the value of the refractive index n of the material constituting the first light guiding member is increased. This is because the larger a refractive index difference between the first light guiding member 40 and air is, the more strongly the stray light occurring within the first light guiding member 40 is refracted when the stray light is emitted from the first light guiding member 40. Further, it can be recognized that in FIGS. 8B, 8D, and 8F, when the inclination (α, β) of the first semitransparent layer 42 is (25 degrees, 65 degrees), the higher the value of the refractive index n of the material constituting the first light guiding member 40, the smaller vignetting (indicated by "B") due to the total reflection limit.

Figure 12A:
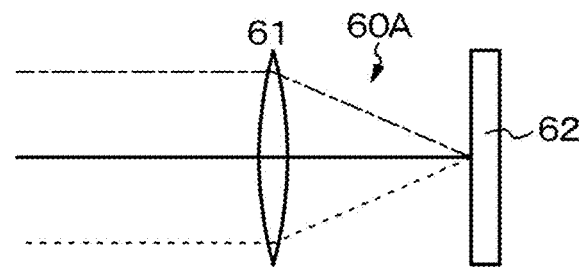
FIGS. 12A, 12B, and 12C are diagrams schematically illustrating an image forming device in a display device or an image display device according to the present disclosure.

In the first embodiment, the image forming device 60 includes an image forming device of the first configuration. Specifically, as illustrated in a conceptual diagram of FIG. 12A, an image forming device 60A includes a spatial light modulating device 62 including an organic EL display device. An image emitted from the spatial light modulating device 62 passes through a lens system (optical system) 61 including a convex lens, for example, becomes collimated light, and goes to the fifth surface 40E of the first light guiding member 40. The whole of the image forming device 60A is housed within a casing (not illustrated). The casing is attached to a temple portion 13 by an attaching member 19. The spatial light modulating device 662 includes a plurality of (for example, 640×480) pixels (organic EL elements) arranged in the form of a two-dimensional matrix.

Figure 12B:
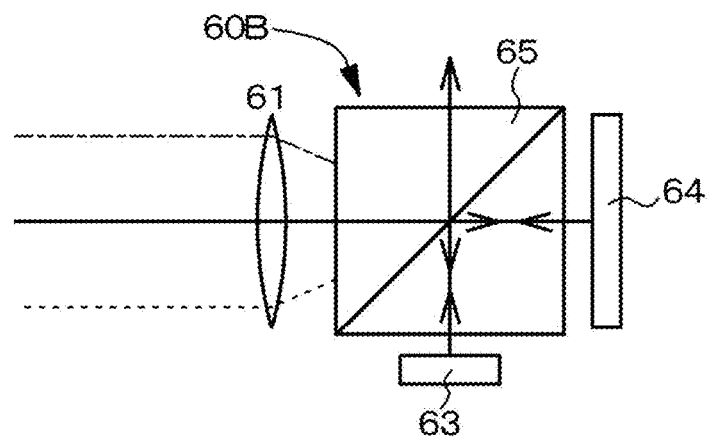

Alternatively, as illustrated in a conceptual diagram of FIG. 12B, an image forming device 60B includes an image forming device of the first configuration. The image forming device 60B specifically includes a reflective spatial light modulating device and a light source 63 including a light emitting diode that emits white light. The whole of each image forming device 60B is housed within a casing (not illustrated). An opening portion (not illustrated) is provided in the casing. Light is emitted from an optical system (a collimated light emitting optical system or a collimating optical system) 61 via the opening portion. The casing is attached to the temple portion 13 by the attaching member 19. The reflective spatial light modulating device includes a liquid crystal display device (LCD) 64 including LCOS as a light valve. Further, a polarization beam splitter 65 is provided which reflects a part of the light from the light source 63 and guides the part of the light to a liquid crystal display device 64, and allows a part of light reflected by the liquid crystal display device 64 to pass through, and guides the part of the light to a lens system (optical system) 61. The liquid crystal display device 64 includes a plurality of (for example, 640×480) pixels (liquid crystal cells) arranged in the form of a two-dimensional matrix. The polarization beam splitter 65 has a well-known configuration and structure. Unpolarized light emitted from the light source 63 collides with the polarization beam splitter 65. A P-polarized light component passes through the polarization beam splitter 65, and is emitted to the outside of the system. On the other hand, an S-polarized light component is reflected in the polarization beam splitter 65, enters the liquid crystal display device 64, is reflected within the liquid crystal display device 64, and is emitted from the liquid crystal display device 64. Here, in the light emitted from the liquid crystal display device 64, light emitted from a pixel displaying "white" includes a large amount of P-polarized light component, and light emitted from a pixel displaying "black" includes a large amount of S-polarized light component. Hence, in the light emitted from the liquid crystal display device 64 and colliding with the polarization beam splitter 65, the P-polarized light component passes through the polarization beam splitter 65, and goes to the fifth surface 40E of the first light guiding member 40. On the other hand, the S-polarized light component is reflected in the polarization beam splitter 65, and is returned to the light source 63. The optical system 61 includes a convex lens, for example. In order to generate collimated light, the image forming device 60B (more specifically the liquid crystal display device 64) is disposed at a place (position) of a focal length in the optical system 61.

Figure 12C:
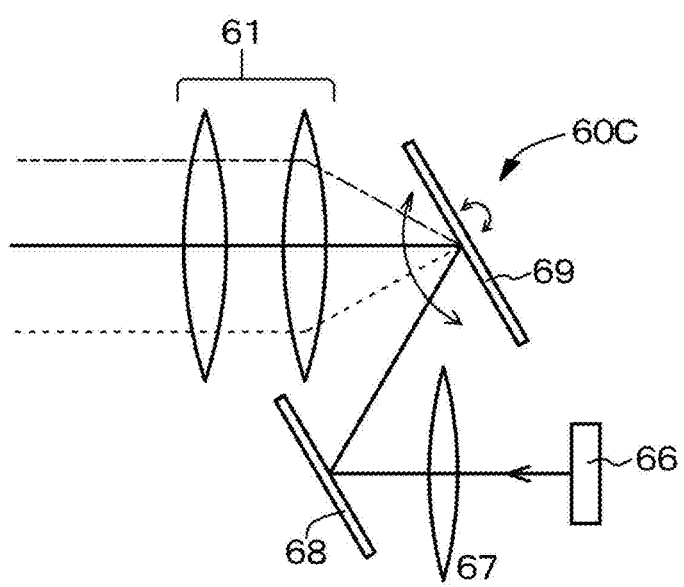

Alternatively, as illustrated in a conceptual diagram of FIG. 12C, an image forming device 60C includes an image forming device of the second configuration. Specifically, the image forming device 60C includes a light source 66 and scanning means 69 for forming an image by scanning light emitted from the light source 66. More specifically, the image forming device 60C includes a laser light source 66 and a MEMS mirror 69. Light emitted from the MEMS mirror 69 passes through a lens system 61, and enters the fifth surface 40E of the first light guiding member 40. Specifically, the laser light source 66 includes a light emitting element that emits a green color. Then, the light emitted from the light source 66 is converted into collimated light by a lens 67, is changed in optical path by a reflecting mirror 68, is horizontally scanned and vertically scanned by the scanning means 69 including a MEMS mirror, in which a micromirror is rotatable in a two-dimensional direction, and is capable of two-dimensionally scanning incident collimated light, and is thereby converted into a kind of two-dimensional image. Virtual pixels (number of pixels is, for example, 640×480) are consequently generated. Then, light from the virtual pixels (the scanning means 69 corresponding to an image emitting unit) passes through the lens system (optical system) 61 having a positive optical power, and a luminous flux converted into collimated light enters the fifth surface 40E of the first light guiding member 40. Incidentally, the whole of the image forming device 60C is housed within a casing (not illustrated).

As will be described later, there is a fear of occurrence of luminance nonuniformity within the effective field-of-view region due to an imbalance in density of an emitted pencil of light rays emitted from a light guiding member. In order to prevent the luminance nonuniformity, a wide width of a pencil of light rays guided within the light guiding member needs to be secured. For this purpose, a collimated luminous flux is made to enter the first light guiding member 40 with a wide light ray pencil width. Hence, at the position of the light incidence surface (fifth surface 40E) of the first light guiding member 40 which position corresponds to the position of an exit pupil of the optical system 61, an exit pupil diameter is preferably designed to cover the entire area of the light incidence surface (fifth surface 40E).

The frame 10 includes: a front portion 11 disposed in front of the observer 20; two temple portions 13 rotatably attached to both ends of the front portion 11 via a hinge 12; and end cover portions (referred to also as tip cells, end pieces, or ear pads) 14 attached to end portions of the respective temple portions 13. In addition, nose pads 10' are attached. That is, an assembly of the frame 10 and the nose pad 10' basically has substantially the same structure as ordinary eyeglasses. Further, each casing is attached to the temple portion 13 by an attaching member 19. The frame 10 is fabricated from a metal or a plastic. Incidentally, each casing may be detachably attached to the temple portion 13 by the attaching member 19. In addition, for an observer who possesses and wears eyeglasses, each casing may be detachably attached to the temple portion 13 of the frame 10 of the eyeglasses possessed by the observer by the attaching member 19. Each casing may be attached to the outside of the temple portion 13, or may be attached to the inside of the temple portion 13. Alternatively, a supporting member 31 may be fitted into a rim 11" (illustrated only in FIGS. 11B and 11C) provided to the front portion 11.

Further, wiring (a signal line, a power supply line, or the like) 15 extending from one image forming device 60 extends from the end portion of the end cover portion 14 to the outside via the insides of the temple portion 13 and the end cover portion 14, and is connected to a control device (a control circuit or control means) 18. Further, each image forming device 60 includes a headphone unit 16, and wiring 16' for the headphone unit which wiring extends from each image forming device 60 extends from the end portion of the end cover portion 14 to the headphone unit 16 via the insides of the temple portion 13 and the end cover portion 14. More specifically, the wiring 16' for the headphone unit extends from the end portion of the end cover portion 14 to the headphone unit 16 so as to circle around the rear side of a pinna (auricle). Such a configuration makes it possible to provide a neatly formed display device without giving an impression that the headphone unit 16 and the wiring 16' for the headphone unit are arranged in a disorderly manner.

The wiring (a signal line, a power supply line, or the like) 15 is connected to the control device (control circuit) 18, as described above. The control device 18 performs processing for image display. The control device 18 can include a well-known circuit.

An imaging device (camera) 17 including a solid-state imaging element including a CCD or CMOS sensor and a lens (the solid-state imaging element and the lens are not illustrated) is attached to a central part 11' of the front portion 11 by an appropriate attaching member (not illustrated) as required. A signal from the imaging device 17 is sent out to the control device (control circuit) 18 via wiring (not illustrated) extending from the imaging device 17.

As described above, in the optical device according to the first embodiment, the value of α is a value exceeding zero degrees, and the value of β is also a value exceeding zero degrees. It is therefore possible to suppress (reduce) inclusion of stray light in the light (image) emitted from the first light guiding member. As a result, an image of high image quality can be provided. In addition, the first light guiding member has an effect of enlarging the width of a pencil of light rays in the X-direction, so that the exit pupil of the observation system is enlarged in the X-direction, and the second light guiding member has an effect of enlarging the width of a pencil of light rays in the Y-direction, so that the exit pupil of the observation system is enlarged in the Y-direction. Hence, the optical device can enlarge the exit pupil of the observation system two-dimensionally. Therefore, the optical system can be miniaturized, and a great advantage is obtained in designing a display device providing a wide field of view.

Second Embodiment

Figure 13:
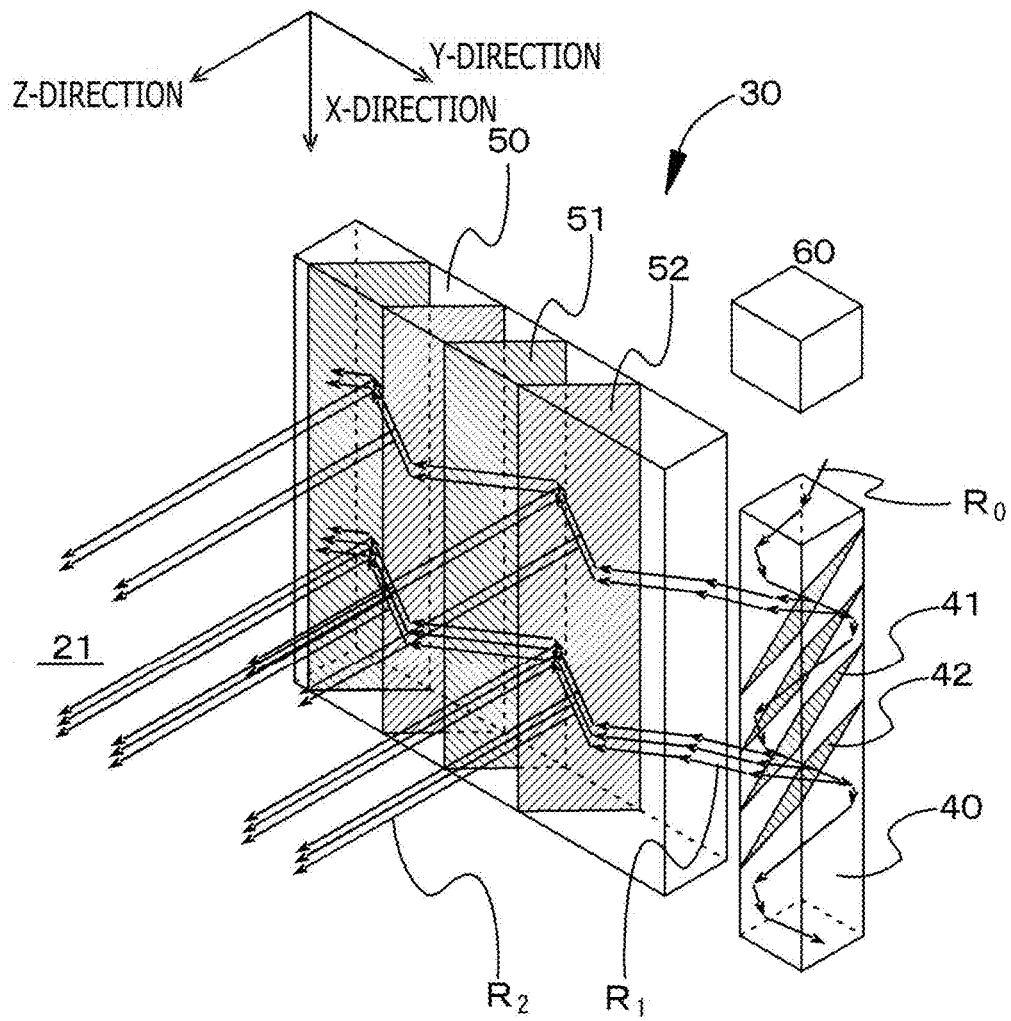
FIG. 13 is a diagram schematically illustrating the arrangement of a first light guiding member and a second light guiding member in the optical device according to the second embodiment together with the behavior of light, an image forming device, and an observer.
Figure 14:
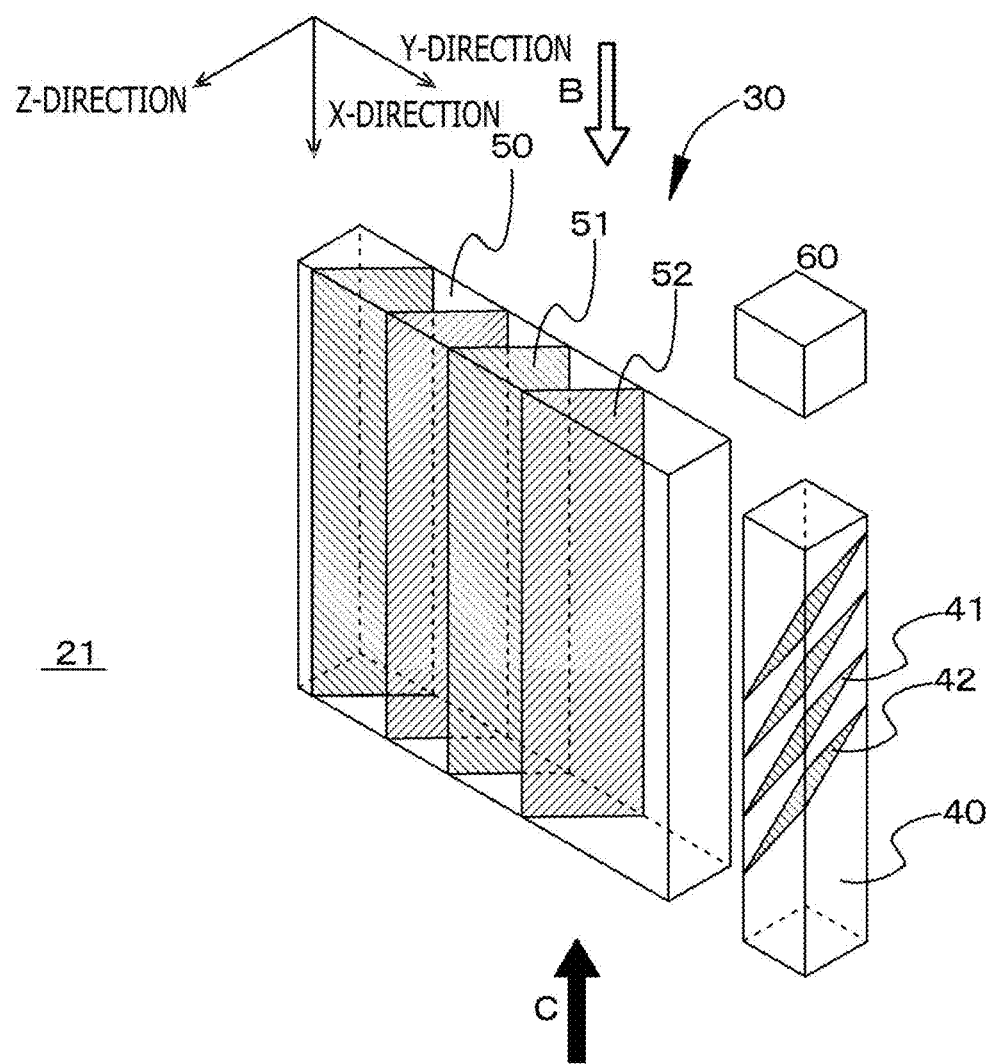
FIG. 14 is a diagram schematically illustrating the arrangement of the first light guiding member and the second light guiding member in the optical device according to the second embodiment illustrated in FIG. 13.

A second embodiment is a modification of the first embodiment. FIG. 13 schematically illustrates the arrangement of a first light guiding member and a second light guiding member in an optical device according to the second embodiment together with the behavior of light, an image forming device, and an eye of an observer. FIG. 14 schematically illustrates the arrangement of the first light guiding member and the second light guiding member. Incidentally, side views of the first light guiding member and the second light guiding member when the first light guiding member and the second light guiding member are viewed from the directions of an outlined arrow B in FIG. 14 and a black arrow C in FIG. 14 are similar to those illustrated in FIGS. 2B and 2C.

In the first embodiment, the rod-shaped first light guiding member 40 extends in a horizontal direction. In the second embodiment, on the other hand, the rod-shaped first light guiding member 40 extends in a vertical direction. An optical device, an image display device, and a display device according to the second embodiment can be made otherwise similar to the optical device, the image display device, and the display device described in the first embodiment, and therefore detailed description will be omitted.

Third Embodiment

A third embodiment is a modification of the first to second embodiments. In an optical device, in a case where the width of a pencil of light rays propagating within a light guiding member is not sufficiently wide, there is a fear of occurrence of an imbalance in density of the pencil of light rays emitted from the light guiding member. In an optical device according to the third embodiment, the width of the pencil of light rays propagating within the light guiding member is widened by providing a semitransparent mirror film to the light guiding member. That is, in the example of the optical device according to the first embodiment illustrated in FIG. 15B, a light ray pencil width $R'_0$ limited by the width of the light incidence surface (eighth surface 50B) is insufficient in some cases. As a result, losses (indicated by hatching in FIG. 15B) in a pencil of light rays emitted from the seventh surface 50A of the second light guiding member 50 occur in some cases. This state is illustrated on a right hand side of FIG. 15B. That is, because of the insufficiency of the light ray pencil width limited by the width (thickness) of the light incidence surface (eighth surface 50B), an imbalance occurs in density of the pencil of light rays emitted from the second light guiding member 50, and an amount of light entering the eye 21 of the observer 20 periodically changes according to an angle of view in the vertical direction. As a result, band-shaped luminance nonuniformity occurs in some cases.

Figure 15A:
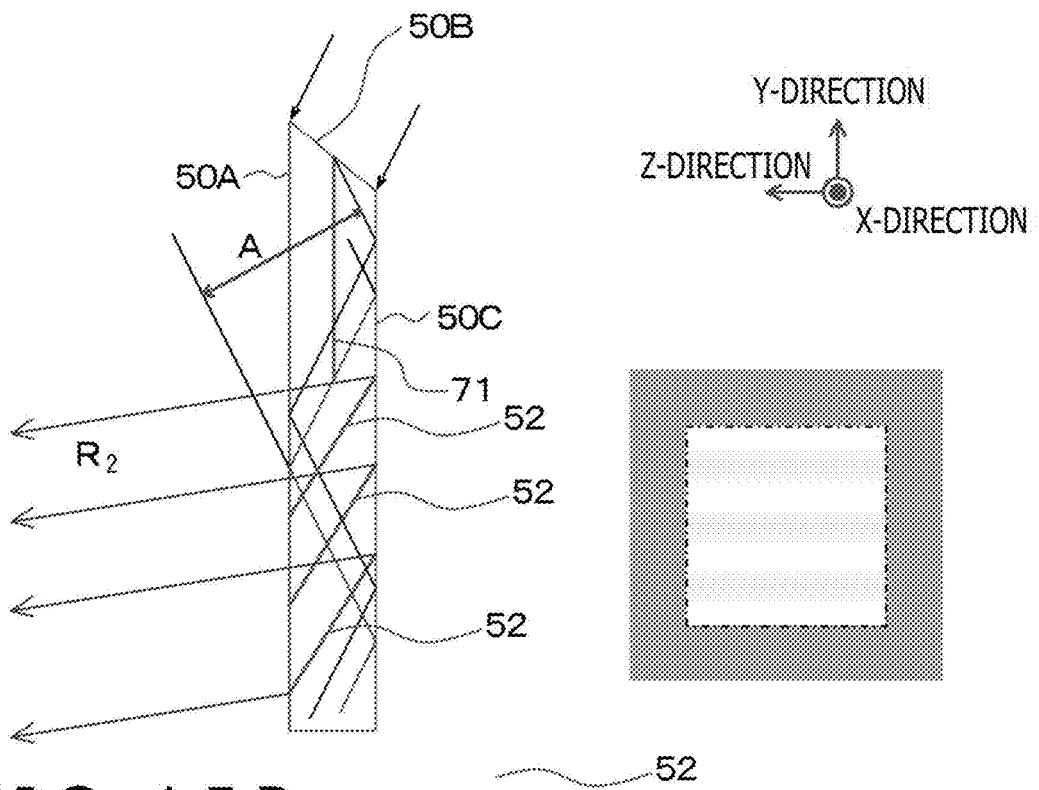
FIGS. 15A and 15B are diagrams of assistance in explaining relations between a first light guiding member constituting an optical device according to a third embodiment and the first light guiding member constituting the optical device according to the first embodiment and image nonuniformity.
Figure 15B:
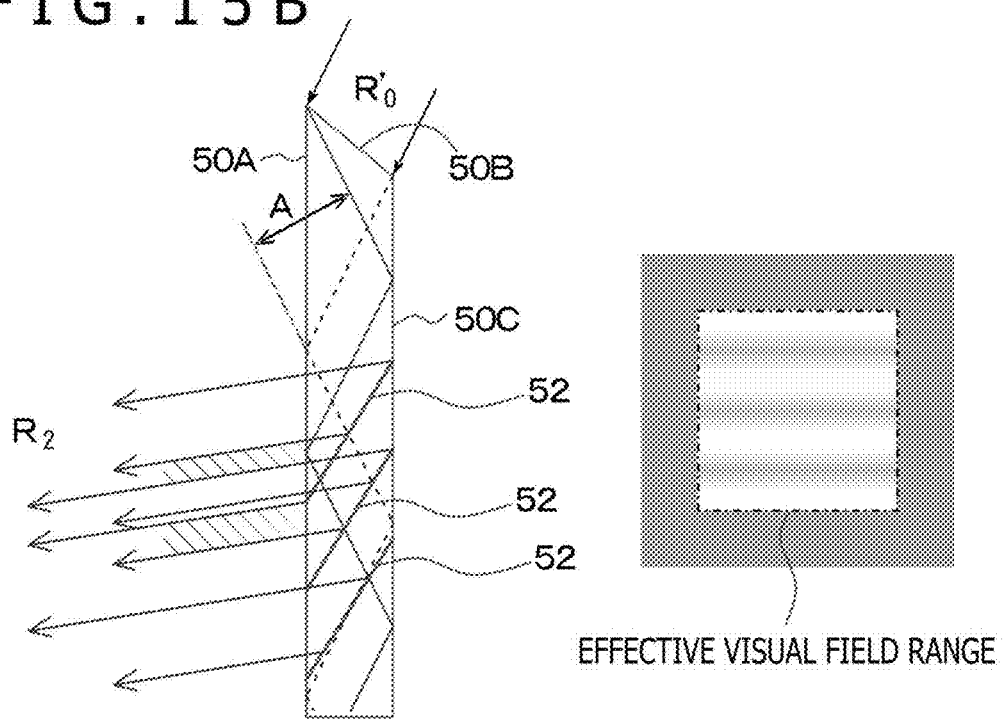

On the other hand, in the second light guiding member 50 in the optical device according to the third embodiment illustrated in FIG. 15A, a semitransparent mirror film 71 parallel with the seventh surface 50A and the ninth surface 50C (total reflection surfaces 50A and 50C) of the second light guiding member 50 is formed in the vicinity of the light incidence surface (eighth surface 50B). The light ray pencil width can be widened by branching light rays colliding with the semitransparent mirror film 71 in a transmission direction and a reflection direction. As a result, the density of the pencil of light rays emitted from the second light guiding member 50 can be uniformized. This state is illustrated on a right hand side of FIG. 15A. That is, a wide light ray pencil width can be obtained by the second light guiding member 50 by branching the light rays colliding with the semitransparent mirror film 71 into a transmission direction and a reflection direction. As a result, the pencil of light rays emitted from the second light guiding member 50 uniformly enters the eye 21 of the observer 20. Thus, the luminance nonuniformity can be suppressed. Incidentally, in FIGS. 15A and 15B, an arrow "A" represents the light ray pencil width (maximum width of the width of a pencil of light rays emitted from the semitransparent mirror film 71) defining the width of the pencil of light rays guided in the second light guiding member 50.

Figure 16:
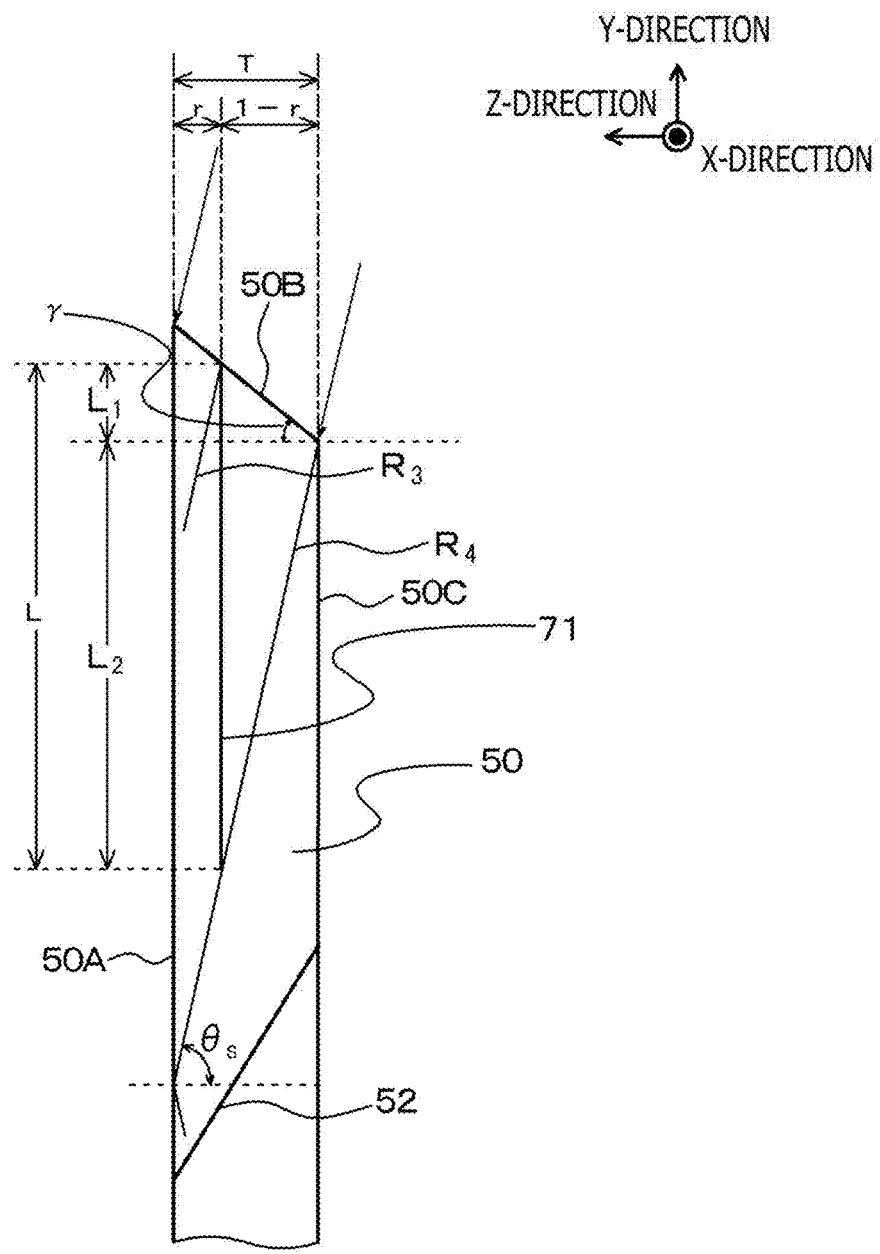
FIG. 16 is a schematic sectional view of a light incidence part of a second light guiding member constituting the optical device according to the third embodiment.

FIG. 16 illustrates an enlarged view of a state in which the semitransparent mirror film 71 is formed in the vicinity of the light incidence surface (eighth surface 50B). A maximum value $L_{max}$ of the length in the Y-direction of the semitransparent mirror film 71 preferably satisfies the following value. Here, letting $R_3$ be a light ray corresponding to one end of an incidence surface in a collimated luminous flux propagated within the second light guiding member 50 at a shallowest angle, and letting $R_4$ be a light ray corresponding to another end of the incidence surface in the collimated luminous flux, a maximum length $L_{max}$ of the semitransparent mirror film 71 is preferably a value such that the light ray $R_4$ collides with the semitransparent mirror film 71 at least once.

Specifically, letting T be the thickness (thickness in a Z-direction) of the second light guiding member 50, letting γ be the inclination angle (angle formed with the XZ plane) of the light incidence surface (eighth surface 50B) of the second light guiding member 50, letting $\theta_s$ be the total reflection angle of a light ray propagating at the shallowest angle within the second light guiding member 50, letting T·r be a distance from the semitransparent mirror film 71 to the ninth surface 50C of the second light guiding member 50, and letting (1−r)T be a distance from the semitransparent mirror film 71 to the seventh surface 50A of the second light guiding member 50, $L_1 = (1-r) \cdot T \cdot \tan(\gamma)$ $L_2 = (1-r) \cdot T \cdot \tan(\theta_s)$ Hence, $L_{max} = L_1 + L_2 = (1-r) \cdot T \cdot \{\tan(\gamma) + \tan(\theta_s)\}$ It is needless to say that the above argument for the second light guiding member 50 can be applied to the first light guiding member 40.

As illustrated in FIG. 1, the first light guiding member 40 has a section in which a length and a width are close to each other in an aspect ratio, and the collimated luminous flux of image light is guided while repeating total reflection surface between two sets of parallel opposed side surfaces (the first surface 40A and the third surface 40C and the second surface 40B and the fourth surface 40D). Therefore, in a case where the thickness (width) of a pencil of light rays limited by the area of the light incidence surface (fifth surface 40E) is not sufficient, an imbalance occurs in some cases in density of an emitted pencil of light rays resulting from two total reflection directions, the emitted pencil of light rays being emitted to the second light guiding member 50.

Figure 17A:
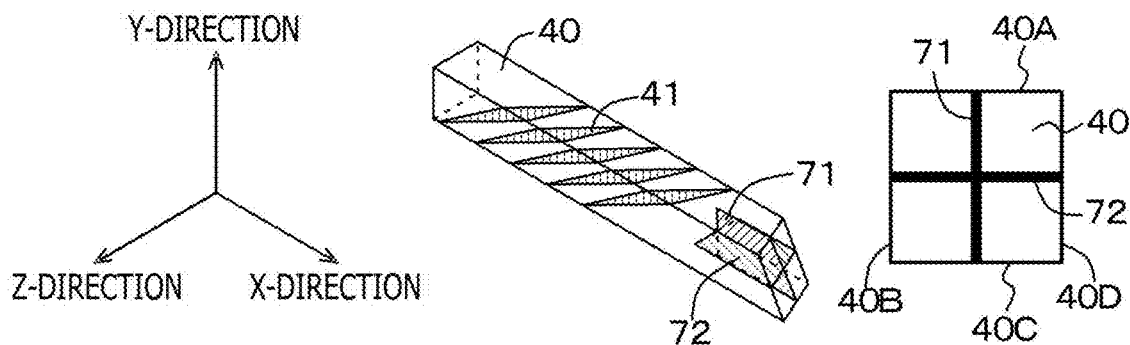
FIGS. 17A, 17B, and 17C are schematic perspective views of the first light guiding member constituting the optical device according to the third embodiment.

In the optical device according to the third embodiment, the first light guiding member 40 is provided with a semitransparent mirror film 72 provided in parallel with the first surface 40A and the third surface 40C (see FIG. 17C), or a semitransparent mirror film 71 provided in parallel with the second surface 40B and the fourth surface 40D (see FIG. 17B), or a semitransparent mirror film 72 provided in parallel with the first surface 40A and the third surface 40C and a semitransparent mirror film 71 provided in parallel with the second surface 40B and the fourth surface 40D (see FIG. 17A).

That is, in the example illustrated in FIG. 17A, the semitransparent mirror film 72 provided in parallel with the first surface 40A and the third surface 40C and the semitransparent mirror film 71 provided in parallel with the second surface 40B and the fourth surface 40D are provided crosswise, so that the light ray pencil width can be widened two-dimensionally. In addition, in the example illustrated in FIG. 17B, the semitransparent mirror film 71 provided in parallel with the second surface 40B and the fourth surface 40D is provided, so that the density of an emitted pencil of light rays corresponding to directions of total reflection at the second surface 40B and the fourth surface 40D is uniformized. In the example illustrated in FIG. 17C, the semitransparent mirror film 72 provided in parallel with the first surface 40A and the third surface 40C is provided, so that the density of an emitted pencil of light rays corresponding to directions of total reflection at the first surface 40A and the third surface 40C is uniformized.

Figure 17B:
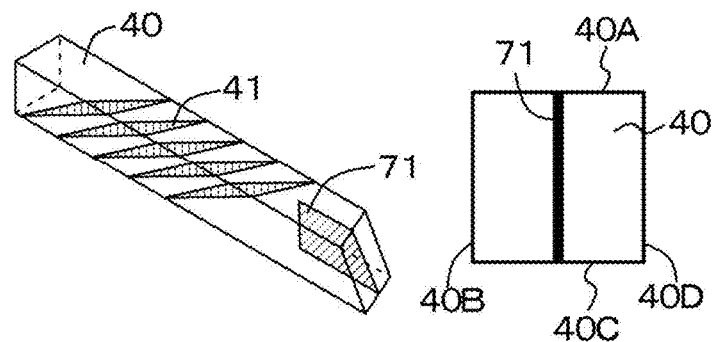
Figure 17C:
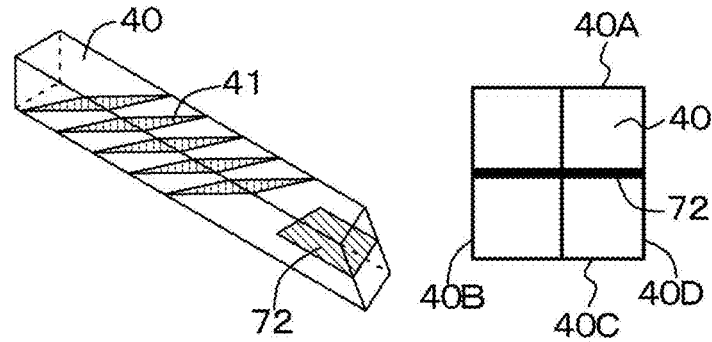
Figure 18A:
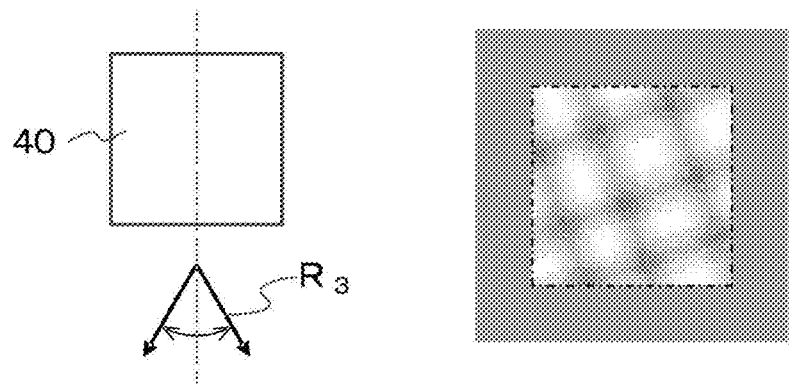
FIGS. 18A and 18B are schematic diagrams of light incidence surfaces of the first light guiding members constituting the optical device according to the first embodiment and the optical device according to the third embodiment, and are schematic diagrams of image nonuniformity.

Incidentally, a configuration can be adopted in which the semitransparent mirror film 72 provided in parallel with the first surface 40A and the third surface 40C within the first light guiding member 40 is provided in a part of a region located at equal distances from the first surface 40A and the third surface 40C (see FIG. 17C). Alternatively, a configuration can be adopted in which a semitransparent mirror film 75 provided to the first light guiding member 40 so as to be in parallel with the first surface 40A and the third surface 40C is provided in a part of a region on the first surface 40A or a part of a region on the third surface 40C (in a part of a region on the first surface 40A in the illustrated example) (see FIGS. 19A and 19B). Alternatively, a configuration can be adopted in which the semitransparent mirror film 71 provided in parallel with the second surface 40B and the fourth surface 40D within the first light guiding member 40 is provided in a part of a region located at equal distances from the second surface 40B and the fourth surface 40D (see FIG. 17B). Alternatively, a configuration can be adopted in which a semitransparent mirror film 73 provided to the first light guiding member 40 so as to be in parallel with the second surface 40B and the fourth surface 40D is provided in a part of a region on the second surface 40B or a part of a region on the fourth surface 40D (see FIGS. 18B and 19B). Thus, providing the semitransparent mirror films 71 and 72 to the first light guiding member 40 can prevent the occurrence of nonuniformity (light and shade or shading) in an image emitted from the third surface 40C of the first light guiding member 40. Incidentally, FIG. 18A illustrates the first light guiding member 40 to which neither of the semitransparent mirror films 71 and 72 is provided.

States in which nonuniformity (light and shade or shading) occurs in an image are schematically illustrated on right hand sides of FIGS. 18A, 18B, 19A, and 19B. In the example illustrated in FIG. 18A, the thickness of a pencil of light rays limited by the area of the light incidence surface (fifth surface 40E) is not sufficient. Therefore, band-shaped luminance nonuniformities due to two total reflection directions are superimposed so as to intersect each other, so that a luminance nonuniformity in a lattice form occurs. In the example illustrated in FIG. 18B, on the other hand, the semitransparent mirror film 73 is formed, and thus the width of a pencil of light rays totally reflected at the second surface 40B and the fourth surface 40D is widened. Therefore, a band-shaped luminance nonuniformity corresponding to this total reflection direction is suppressed, and only a luminance nonuniformity corresponding to the Z-direction occurs. Further, in the example illustrated in FIG. 19A, the semitransparent mirror film 75 is formed, and thus the width of a pencil of light rays totally reflected at the first surface 40A and the third surface 40C is widened. Therefore, a band-shaped luminance nonuniformity corresponding to this total reflection direction is suppressed, and only a luminance nonuniformity corresponding to the Y-direction occurs. In addition, in the example illustrated in FIG. 19B, the semitransparent mirror films 73 and 75 are formed, and thus the width of a pencil of light rays totally reflected at the second surface 40B and the fourth surface 40D and the width of a pencil of light rays totally reflected at the first surface 40A and the third surface 40C are widened. Therefore, band-shaped luminance nonuniformities corresponding to these total reflection directions are suppressed, so that a state without luminance nonuniformities is achieved.

In a case where a semitransparent mirror film is provided in a part of a region on the first surface 40A or a part of a region on the third surface 40C or in a case where a semitransparent mirror film is provided in a part of a region on the second surface 40B or in a part of a region on the fourth surface 40D, a protective member 74 or 76 is preferably provided on a surface of the semitransparent mirror film which surface is not in contact with the first light guiding member 40. It suffices to select the protective member 74 or 76 from a material constituting a light guiding member as appropriate.

Similarly, a configuration can be adopted in which the second light guiding member 50 is provided with a semitransparent mirror film disposed in parallel with the seventh surface 50A and the ninth surface 50C, as described earlier. Then, in this case, a configuration can be adopted in which the semitransparent mirror film provided in parallel with the seventh surface 50A and the ninth surface 50C within the second light guiding member 50 is provided in a part of a region located at equal distances from the seventh surface 50A and the ninth surface 50C, or a configuration can be adopted in which the semitransparent mirror film provided to the second light guiding member 50 so as to be in parallel with the seventh surface 50A and the ninth surface 50C is provided in a part of a region on the seventh surface 50A or a part of a region on the ninth surface 50C. Thus, providing the semitransparent mirror film to the second light guiding member 50 can prevent the occurrence of nonuniformity (light and shade or shading) in an image emitted from the seventh surface 50A of the second light guiding member 50. In a case where the semitransparent mirror film is provided in a part of a region on the seventh surface 50A or a part of a region on the ninth surface 50C, a protective member is preferably provided on a surface of the semitransparent mirror film which surface is not in contact with the second light guiding member 50. It suffices to select the protective member from a material constituting a light guiding member as appropriate.

Figure 18B:
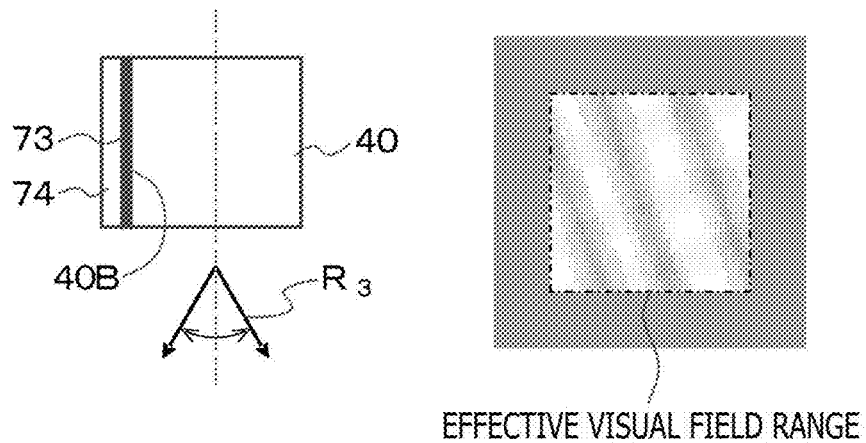
Figure 19A:
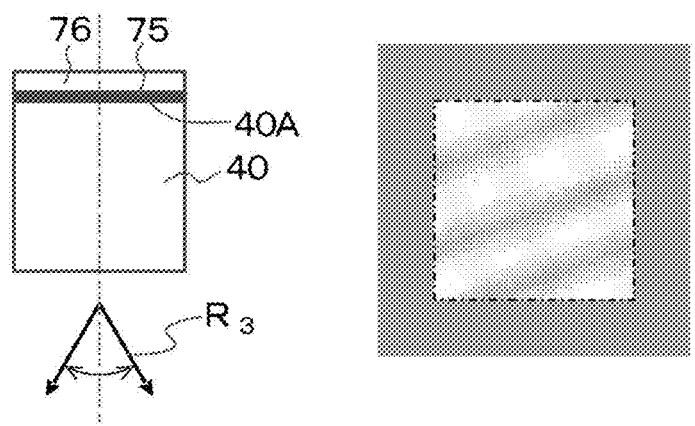
FIGS. 19A and 19B are schematic diagrams of light incidence surfaces of first light guiding members constituting modifications of the optical device according to the third embodiment, and are schematic diagrams of image nonuniformity.
Figure 19B:
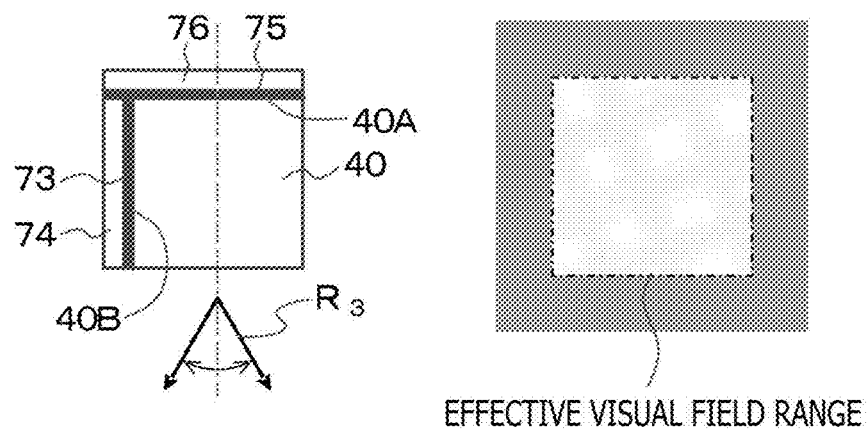

The light guiding members having the semitransparent mirror films 73 and 75 illustrated in FIGS. 18B, 19A, and 19B are very useful because the semitransparent mirror films 73 and 75 can be expected to produce a sufficient effect while the semitransparent mirror films 73 and 75 are much easier to manufacture than the light guiding members having the semitransparent mirror films 71 and 72 illustrated in FIGS. 17A, 17B, and 17C.

In the optical devices according to the embodiments described above, the first light guiding member 40 and the second light guiding member 50 have the first semitransparent layers 42 and the second semitransparent layers 52 as discontinuity boundaries formed within the light guiding members, so that there is a fear of the first light guiding member 40 and the second light guiding member 50 being destroyed by an impact from the outside. Hence, irrespective of whether or not a semitransparent mirror film is provided, it is preferable to affix, to one or more side surfaces of a light guiding member, a protective member (cover plate) 74 or 76 having a same refractive index as the light guiding material and having a smaller thickness than the light guiding member. When the refractive indexes of the light guiding material and the protective member are made equal to each other, reliability of the light guiding member can be improved while a total reflection condition is maintained.

Fourth Embodiment

Figure 20:
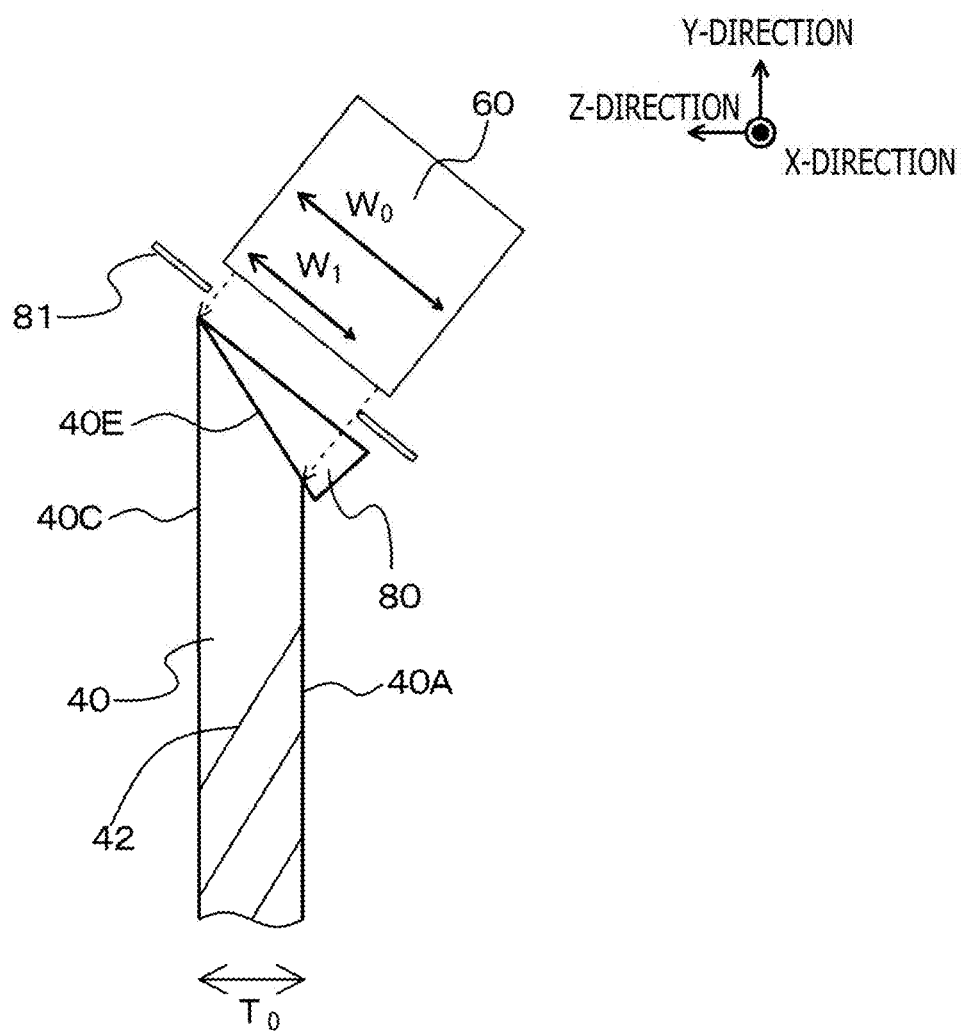
FIG. 20 is a schematic sectional view of a light incidence part of a first light guiding member constituting an optical device according to a fourth embodiment.
Figure 21:
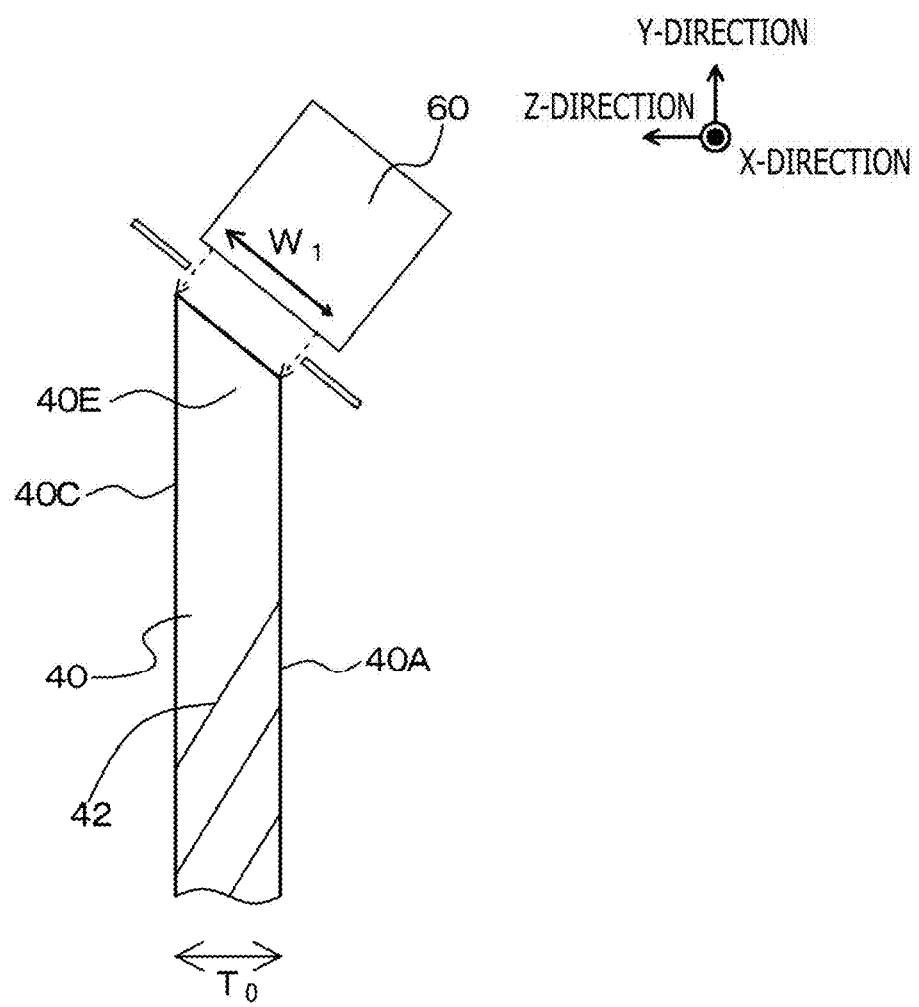
FIG. 21 is a schematic sectional view of a light incidence part of the first light guiding member constituting the optical device according to the first embodiment.

A fourth embodiment is a modification of the first to third embodiments. In an optical device according to the fourth embodiment, as illustrated in a schematic sectional view of FIG. 20 illustrating a light incidence part of the first light guiding member, a sectional area enlarging portion 80 that enlarges the sectional area of light incident on the fifth surface 40E is provided in the vicinity of the fifth surface 40E of the first light guiding member 40. In addition, though not illustrated in the figure, a second sectional area enlarging portion that enlarges the sectional area of light incident on the eighth surface 50B is provided in the vicinity of the eighth surface 50B of the second light guiding member. Thus, providing the sectional area enlarging portion 80 can reduce the thickness of the first light guiding member 40, and can reduce the thickness in the Z-direction of the second light guiding member. FIG. 20 illustrates the width $W_0$ of a pencil of light rays incident on the fifth surface 40E of the first light guiding member 40 and the thickness $T_0$ of the first light guiding member 40 when the sectional area enlarging portion 80 is provided, and FIG. 20 also illustrates the width $W_1$ of a pencil of light rays incident on the fifth surface 40E of the first light guiding member 40 in a case where the sectional area enlarging portion 80 is not provided. Incidentally, FIG. 21 illustrates a schematic sectional view of a light incidence part of an optical device not provided with the sectional area enlarging portion 80, and FIG. 21 also illustrates the width $W_1$ of a pencil of light rays incident on the fifth surface 40E of the first light guiding member 40 and the thickness $T_0$ of the first light guiding member 40.

The sectional area enlarging portion 80 can, for example, be formed by incorporating a prism member having a refractive index equal to that of the light guiding material in the vicinity of a light incidence portion (fifth surface 40E) of the first light guiding member 40 and a light incidence portion (eighth surface 50B) of the second light guiding member, or can be formed by processing the light incidence portion (fifth surface 40E) of the first light guiding member 40 and the light incidence portion (eighth surface 50B) of the second light guiding member into a prism shape. Alternatively, a form can be adopted in which the value of an inclination angle of a light incidence surface of the sectional area enlarging portion 80 is smaller than the value of an inclination angle of the fifth surface 40E of the first light guiding member 40, and a form can be adopted in which the value of an inclination angle of a light incidence surface of the second sectional area enlarging portion is smaller than the value of an inclination angle of the eighth surface 50B of the second light guiding member 50 (see also FIG. 16). Then, it is thereby possible to make the width of a pencil of incident light rays wider than in an optical device without the sectional area enlarging portion 80, while maintaining an angle component of light rays coupled to the first light guiding member 40.

Incidentally, light emitted from the central portion of the image forming device 60 preferably perpendicularly enters the light incidence surface of the sectional area enlarging portion 80. In addition, when light emitted from the central portion of the image forming device 60 is guided within the first light guiding member 40 and emitted from the third surface 40C of the first light guiding member 40, the light preferably perpendicularly enters the light incidence surface of the second sectional area enlarging portion.

In addition, a light shielding unit 81 having an opening portion is disposed between the image forming device 60 and the first light guiding member 40 to prevent undesired light from being emitted from the image forming device 60 and entering the first light guiding member 40. Similarly, a light shielding unit having an opening portion may be disposed between the first light guiding member 40 and the second light guiding member 50 to prevent undesired light of the light emitted from the first light guiding member 40 from entering the second light guiding member 50.

Fifth Embodiment

A fifth embodiment is a modification of the first to fourth embodiments. In the first light guiding member 40 including the plurality of first semitransparent layers 42 arranged in parallel with each other, the intensity of light rays guided while repeating total reflection is attenuated according to the optical transmittance of the first semitransparent layers 42 each time the light rays pass through a first semitransparent layer 42. In order to obtain as uniform density of an emitted pencil of light rays as possible in the entire area of the light emission surface (third surface 40C) of the first light guiding member 40, it suffices to design the optical reflectance of the first semitransparent layer 42 to be increased so as to correct the intensity attenuation. This design is effective for both the first light guiding member 40 and the second light guiding member 50.

Specifically, in the optical device according to the fifth embodiment, a first semitransparent layer 42 located at a position far from the fifth surface 40E among the plurality of first semitransparent layers 42 constituting the first deflecting means 41 has a higher optical reflectance (lower optical transmittance) than a first semitransparent layer 42 located at a position near the fifth surface 40E. In addition, a second semitransparent layer 52 located at a position far from the eighth surface 50B among the plurality of second semitransparent layers 52 constituting the second deflecting means 51 has a higher optical reflectance (lower optical transmittance) than a second semitransparent layer 52 located at a position near the eighth surface 50B.

In the optical device, when a geometric arrangement of the first semitransparent layers 42 is determined, an angle component of light rays entering the eye 21 of the observer 20 among light rays reflected by a certain first semitransparent layer 42 and emitted from the first light guiding member 40 is determined according to a distance from the light incidence surface (fifth surface 40E) of the first light guiding member 40 to the first semitransparent layer 42. In order to enhance light guiding efficiency of the optical device, it suffices to design the angle characteristic of the optical reflectance of each first semitransparent layer 42 appropriately. That is, for a first semitransparent layer 42, relation between an angle (angle of reflection) formed between a normal to the first semitransparent layer 42 and a light ray reflected by the first semitransparent layer 42 and optical reflectance is preferably defined depending on the distance from the fifth surface. Similarly, for a second semitransparent layer 52, relation between an angle (angle of reflection) formed between a normal to the second semitransparent layer 52 and a light ray reflected by the second semitransparent layer 52 and optical reflectance is preferably defined depending on the distance from the eighth surface. Thus, an angle component entering the eye 21 of the observer 20 is extracted efficiently while optical reflectance is increased, whereas losses of other angle components are reduced by transmitting the other angle components while optical reflectance is conversely decreased, so that high light guiding efficiency can be obtained. This design is effective for both the first light guiding member 40 and the second light guiding member 50.

In the optical device according to the fifth embodiment, the inclination (α, β) of the plurality of first semitransparent layers 42 was set at (25 degrees, 60 degrees), and the effective field-of-view region of an output image was set at a diagonal angle of 78 degrees. In addition, BK7 (refractive index: 1.517) was used as a light guiding material for the first light guiding member 40.

FIG. 22A illustrates a light emission state in each area in the first light guiding member of the optical device according to the fifth embodiment. FIG. 22B illustrates relation between the angle of reflection and optical reflectance. FIG. 22A illustrates a result obtained by dividing the first light guiding member 40 into a plurality of areas [specifically three areas 43, 44, and 45 (a first area 43, a second area 44, and a third area 45)] from a light incidence surface side, and designing the first semitransparent layers 42 included in the respective areas with different optical reflectances. When an incident cone R5 is made incident on the incidence surface 40E of the first light guiding member 40, emitted cones R6 are output from an entire area of light emission surface (third surface 40C) of the first light guiding member 40. However, in the emitted cones R6-43, R6-44, and R6-45 output from the three areas 43, 44, and 45, angle ranges reaching the eye 21 of the observer 20 are limited to I1, I2, and I3, respectively. At this time, emission light rays in the angle ranges of I1, I2, and I3 are respectively reflected at predetermined angles at the first semitransparent layers 42, and are emitted from the first light guiding member 40. Specifically, a reflection angle formed by the emission light rays in the angle range I1 with a normal to a first semitransparent layer 42 is 39 degrees to 55 degrees, a reflection angle formed by the emission light rays in the angle range I2 with the normal to the first semitransparent layer 42 is 23 degrees to 45 degrees, and a reflection angle formed by the emission light rays in the angle range I3 with the normal to the first semitransparent layer 42 is 10 degrees to 32 degrees.

Accordingly, as illustrated in FIG. 22B, the optical reflectances of the first semitransparent layers 42 present in the three areas 43, 44, and 45 were designed on the basis of angle dependence such that only angle components entering the eye 21 of the observer 20 were reflected and extracted, and the other angle components were transmitted. For example, it is possible to extract light rays corresponding to the angle range I1 efficiently by imparting an optical reflectance 43' having an angle dependence to the first semitransparent layers 42 in the area 43, and it is possible to reduce losses and obtain high light guiding efficiency by transmitting light rays corresponding to the angle ranges I2 and I3 to the areas 44 and 45 in the rear. Similarly, for example, it is possible to extract light rays corresponding to the angle range I2 efficiently by imparting an optical reflectance 44' having an angle dependence to the first semitransparent layers 42 in the area 44, and it is possible to reduce losses and obtain high light guiding efficiency by transmitting light rays corresponding to the angle range I3 to the area 45 in the rear. In addition, for example, it is possible to extract light rays corresponding to the angle range I3 efficiently by imparting an optical reflectance 45' having an angle dependence to the first semitransparent layers 42 in the area 45.

Further, the optical reflectances 43', 44', and 45' of the first semitransparent layers 42 located in the areas 43, 44, and 45 are designed so as to have angle dependence and such that the more rearward an area is, the higher the optical reflectance in the area is. This is to correct intensity attenuation occurring each time the signal light rays propagating within the first light guiding member 40 pass through a first semitransparent layer 42. As a result, it is possible to realize uniform luminance in the entire effective field-of-view region, and enhance light guiding efficiency.

The optical device, the image display device, and the display device according to the present disclosure have been described above on the basis of preferred embodiments. However, the optical device, the image display device, and the display device according to the present disclosure are not limited to these embodiments. The direction of enlarging the exit pupil is not limited to the direction illustrated in FIGS. 1 and 13, but a direction such that image enlarging directions of the first light guiding member and the second light guiding member are orthogonal to each other suffices.

Figure 11D:
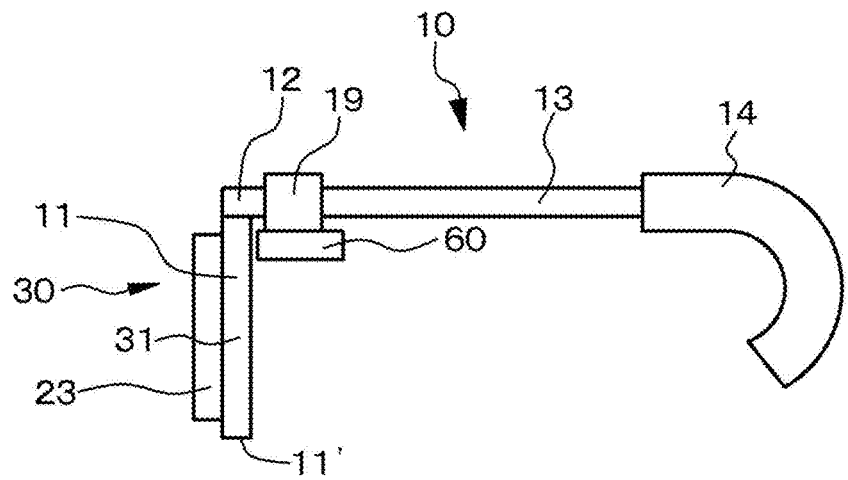

The optical device 30 may further include a diopter correcting lens. Specifically, as illustrated in a schematic sectional view of FIG. 11C, a diopter correcting lens 22 corresponding to the diopter of the observer 20 may be disposed in an optical path from the optical device 30 to the eye 21 of the observer 20. In the display device, an output image from the optical device is projected to infinity in principle. Hence, in order for an output image to be observed with good resolution, the diopter correcting lens 22 corresponding to the diopter of the observer 20 is preferably inserted in the optical path from the second light guiding member 50 to the eye 21 of the observer 20. In addition, as illustrated in a schematic diagram of FIG. 11D illustrating a modification of the display device according to the first embodiment as viewed from a side, a dimming device 23 described earlier may be provided on the observer side of the optical device 30 or on an opposite side from the observer side.

Incidentally, the present disclosure can also adopt configurations as follows.
[A01]<<Optical Device>>
An optical device including:
a first light guiding member having a first surface, a second surface, a third surface opposed to the first surface, a fourth surface opposed to the second surface, a fifth surface, and a sixth surface opposed to the fifth surface, and internally including first deflecting means; and a second light guiding member having a seventh surface, an eighth surface, a ninth surface opposed to the seventh surface, a tenth surface opposed to the eighth surface, an eleventh surface, and a twelfth surface opposed to the eleventh surface, and internally including second deflecting means;

the first surface and the third surface being parallel with each other;

the second surface and the fourth surface being parallel with each other and orthogonal to the first surface and the third surface;

the seventh surface and the ninth surface being parallel with an XY plane in an XYZ orthogonal coordinate system;

light entering from the fifth surface being totally reflected within the first light guiding member, being deflected by the first deflecting means, being emitted from the third surface, entering the eighth surface disposed so as to be separated from the third surface, being totally reflected between the seventh surface and the ninth surface, being deflected by the second deflecting means, and being emitted from the seventh surface;

the first deflecting means including a plurality of first semitransparent layers provided so as to be separated from and in parallel with each other;

letting $\alpha$ be an angle formed between a normal to a first semitransparent layer and an X-axis when the normal to the first semitransparent layer is projected onto an XZ plane, a value of $\alpha$ being a value exceeding zero degrees; and letting $\beta$ be an angle formed between the normal to the first semitransparent layer and the X-axis when the normal to the first semitransparent layer is projected onto the XY plane, a value of $\beta$ being a value exceeding zero degrees.

[A02]

The optical device according to [A01], in which the first light guiding member is provided with a semitransparent mirror film provided in parallel with the first surface and the third surface, or a semitransparent mirror film provided in parallel with the second surface and the fourth surface, or a semitransparent mirror film provided in parallel with the first surface and the third surface and a semitransparent mirror film provided in parallel with the second surface and the fourth surface.

[A03]

The optical device according to [A02], in which the semitransparent mirror film provided in parallel with the first surface and the third surface within the first light guiding member is provided in a part of a region located at equal distances from the first surface and the third surface.

[A04]

The optical device according to [A02], in which the semitransparent mirror film provided to the first light guiding member so as to be in parallel with the first surface and the third surface is provided in a part of a region on the first surface or in a part of a region on the third surface.

[A05]

The optical device according to [A02], in which the semitransparent mirror film provided in parallel with the second surface and the fourth surface within the first light guiding member is provided in a part of a region located at equal distances from the second surface and the fourth surface.

[A06]

The optical device according to [A02], in which the semitransparent mirror film provided to the first light guiding member so as to be in parallel with the second surface and the fourth surface is provided in a part of a region on the second surface or a part of a region on the fourth surface.

[A07]

The optical device according to any one of [A01] to [A06], in which the second light guiding member is provided with a semitransparent mirror film provided in parallel with the seventh surface and the ninth surface.

[A08]

The optical device according to [A07], in which the semitransparent mirror film provided in parallel with the seventh surface and the ninth surface within the second light guiding member is provided in a part of a region located at equal distances from the seventh surface and the ninth surface.

[A09]

The optical device according to [A07], in which the semitransparent mirror film provided to the second light guiding member so as to be in parallel with the seventh surface and the ninth surface is provided in a part of a region on the seventh surface or a part of a region on the ninth surface.

[A10]

The optical device according to any one of [A01] to [A09], in which a sectional area enlarging portion that enlarges a sectional area of light incident on the fifth surface is provided in a vicinity of the fifth surface in the first light guiding member.

[A11]

The optical device according to [A10], in which the sectional area enlarging portion is formed by incorporating a prism member in the vicinity of the fifth surface of the first light guiding member.

[A12]

The optical device according to [A10], in which the sectional area enlarging portion includes the fifth surface of the first light guiding member in a prism shape.

[A13]

The optical device according to [A10], in which a value of an inclination angle of a light incidence surface of the sectional area enlarging portion is smaller than a value of an inclination angle of the fifth surface of the first light guiding member.

[A14]

The optical device according to any one of [A01] to [A10], in which a second sectional area enlarging portion that enlarges a sectional area of light incident on the eighth surface is provided in a vicinity of the eighth surface in the second light guiding member.

[A15]

The optical device according to [A14], in which the second sectional area enlarging portion is formed by incorporating a prism member in a vicinity of the ninth surface of the second light guiding member.

[A16]

The optical device according to [A14], in which the second sectional area enlarging portion includes the eighth surface of the second light guiding member in a prism shape.

[A17]

The optical device according to [A14], in which a value of an inclination angle of a light incidence surface of the second sectional area enlarging portion is smaller than a value of an inclination angle of the eighth surface of the second light guiding member.

[A18]

The optical device according to any one of [A01] to [A17], in which the second deflecting means includes a plurality of second semitransparent layers provided so as to be separated from and in parallel with each other.

[A19]

The optical device according to [A18], in which the first semitransparent layers include a dielectric multilayer film, and the second semitransparent layers include a dielectric multilayer film.

[A20]

The optical device according to any one of [A01] to [A19], in which a first semitransparent layer located at a position far from the fifth surface among the plurality of first semitransparent layers constituting the first deflecting means has a higher optical reflectance than a first semitransparent layer located at a position near the fifth surface.

[A21]

The optical device according to any one of [A01] to [A20], in which for a first semitransparent layer, relation between an angle (angle of reflection) formed between a normal to the first semitransparent layer and a light ray reflected by the first semitransparent layer and optical reflectance is defined depending on a distance from the fifth surface.

[A22]

The optical device according to any one of [A01] to [A21], in which the second deflecting means includes a plurality of second semitransparent layers provided so as to be separated from and in parallel with each other, and for a second semitransparent layer, relation between an angle (angle of reflection) formed between a normal to the second semitransparent layer and a light ray reflected by the second semitransparent layer and optical reflectance is defined depending on a distance from the eighth surface.

[A23]

The optical device according to any one of [A01] to [A22], in which $$20 \text{ (degrees)} \leq \alpha \leq 30 \text{ (degrees) and}$$

$$55 \text{ (degrees)} \leq \beta \leq 65 \text{ (degrees)}$$

are satisfied.

[A24]

The optical device according to any one of [A01] to [A23], in which the third surface and the eighth surface are parallel with each other.

[A25]

The optical device according to any one of [A01] to [A24], in which an air layer is present between the third surface and the eighth surface.

[A26]

The optical device according to any one of [A01] to [A24], in which the third surface and the eighth surface are bonded to each other by using an adhesive.

[A27]

The optical device according to any one of [A01] to [A26], in which a whole of at least one of the first surface, the second surface, the third surface, or the fourth surface of the first light guiding member is covered with a protective member.

[A28]

The optical device according to any one of [A01] to [A27], in which a whole of at least one of the seventh surface or the ninth surface of the second light guiding member is covered with a protective member.

[A29]

The optical device according to [A27] or [A28], in which the protective member includes a material constituting a light guiding member.

[A30]

The optical device according to any one of [A01] to [A29], in which light enters the fifth surface of the first light guiding member via an optical system, and at a position of the fifth surface of the first light guiding member, the position corresponding to a position of an exit pupil of the optical system, an exit pupil diameter covers an entire area of the fifth surface.

[A31]

The optical device according to any one of [A01] to [A30], further including:

a diopter correcting lens.

[B01]<<Image Display Device: First Mode>>

An image display device including:

an image forming device; and an optical device;

the optical device including a first light guiding member having a first surface, a second surface, a third surface opposed to the first surface, a fourth surface opposed to the second surface, a fifth surface, and a sixth surface opposed to the fifth surface, and internally including first deflecting means, and a second light guiding member having a seventh surface, an eighth surface, a ninth surface opposed to the seventh surface, a tenth surface opposed to the eighth surface, an eleventh surface, and a twelfth surface opposed to the eleventh surface, and internally including second deflecting means, the first surface and the third surface being parallel with each other, the second surface and the fourth surface being parallel with each other and orthogonal to the first surface and the third surface, the seventh surface and the ninth surface being parallel with an XY plane in an XYZ orthogonal coordinate system, light entering from the fifth surface being totally reflected within the first light guiding member, being deflected by the first deflecting means, being emitted from the third surface, entering the eighth surface disposed so as to be separated from the third surface, being totally reflected between the seventh surface and the ninth surface, being deflected by the second deflecting means, and being emitted from the seventh surface, the first deflecting means including a plurality of first semitransparent layers provided so as to be separated from and in parallel with each other, letting α be an angle formed between a normal to a first semitransparent layer and an X-axis when the normal to the first semitransparent layer is projected onto an XZ plane, a value of α being a value exceeding zero degrees, and letting β be an angle formed between the normal to the first semitransparent layer and the X-axis when the normal to the first semitransparent layer is projected onto the XY plane, a value of β being a value exceeding zero degrees.

[B02]<<Image Display Device: Second Mode>>
An image display device including:
an image forming device; and
the optical device according to any one of [A01] to [A31].

[C01]<<Display Device: First Mode>>
A display device including:
a frame mounted on a head of an observer; and
an image display device attached to the frame;
the image display device including an image forming device and an optical device;
the optical device including
a first light guiding member having a first surface, a second surface, a third surface opposed to the first surface, a fourth surface opposed to the second surface, a fifth surface, and a sixth surface opposed to the fifth surface, and internally including first deflecting means, and
a second light guiding member having a seventh surface, an eighth surface, a ninth surface opposed to the seventh surface, a tenth surface opposed to the eighth surface, an eleventh surface, and a twelfth surface opposed to the eleventh surface, and internally including second deflecting means,
the first surface and the third surface being parallel with each other,
the second surface and the fourth surface being parallel with each other and orthogonal to the first surface and the third surface,
the seventh surface and the ninth surface being parallel with an XY plane in an XYZ orthogonal coordinate system,
light entering from the fifth surface being totally reflected within the first light guiding member, being deflected by the first deflecting means, being emitted from the third surface, entering the eighth surface disposed so as to be separated from the third surface, being totally reflected between the seventh surface and the ninth surface, being deflected by the second deflecting means, and being emitted from the seventh surface,
the first deflecting means including a plurality of first semitransparent layers provided so as to be separated from and in parallel with each other,
letting α be an angle formed between a normal to a first semitransparent layer and an X-axis when the normal to the first semitransparent layer is projected onto an XZ plane, a value of α being a value exceeding zero degrees, and
letting β be an angle formed between the normal to the first semitransparent layer and the X-axis when the normal to the first semitransparent layer is projected onto the XY plane, a value of β being a value exceeding zero degrees.

[C02]<<Display Device: Second Mode>>
A display device including:
a frame mounted on a head of an observer; and
an image display device attached to the frame;
the image display device including an image forming device and the optical device according to any one of [A01] to [A31].

REFERENCE SIGNS LIST

10 . . . Frame, 10' . . . Nose pad, 11 . . . Front portion, 11' . . . Central part of the front portion, 12 . . . Hinge, 13 . . . Temple portion, 14 . . . End cover portion, 15 . . . Wiring, 16 . . . Headphone unit, 16' . . . Wiring for the headphone unit, 17 . . . Imaging device (camera), 18 . . . Control device (control circuit, control means), 19 . . . Attaching member, 20 . . . Observer, 21 . . . Eye of the observer, 22 . . . Diopter correcting lens, 23 . . . Dimming device, 30 . . . Optical device, 31 . . . Supporting member, 40 . . . First light guiding member, 40A . . . First surface of the first light guiding member, 40B . . . Second surface of the first light guiding member, 40C . . . Third surface of the first light guiding member, 40D . . . Fourth surface of the first light guiding member, 40E . . . Fifth surface of the first light guiding member, 40F . . . Sixth surface of the first light guiding member, 41 . . . First deflecting means, 42 . . . First semitransparent layer, 43, 44, 45 . . . Area of the first light guiding member, 50 . . . Second light guiding member, 50A . . . Seventh surface of the second light guiding member, 50B . . . Eighth surface of the second light guiding member, 50C . . . Ninth surface of the second light guiding member, 50D . . . Tenth surface of the second light guiding member, 50E . . . Eleventh surface of the second light guiding member, 50E . . . Twelfth surface of the second light guiding member, 51 . . . Second deflecting means, 52 . . . Second semitransparent layer, 60, 60A, 60B, 60C . . . Image forming device, 61 . . . Lens system (optical system, collimated light emitting optical system, collimating optical system), 62 . . . Spatial light modulating device, 63 . . . Light source, 64 . . . Liquid crystal display device (LCD), 65 . . . Polarization beam splitter, 66 . . . Light source, 67 . . . Lens, 68 . . . Reflecting mirror, 69 . . . Scanning means, 71, 72, 73, 75 . . . Semitransparent mirror film, 74, 76 . . . Protective member, 80 . . . Sectional area enlarging portion, 81 . . . Light shielding unit, $R_0$ . . . Light ray entering the fifth surface of the first light guiding member, $R'_0$ . . . Width of a pencil of light rays limited by the width of a light incidence surface, $R_1$ . . . fight ray emitted from the third surface of the first light guiding member, $R_2$ . . . Light ray emitted from the seventh surface of the second light guiding member, $R_{U1}$, $R_{U2}$, $R_D$, $R_{U2}$, $R_3$, $R_4$ . . . Light ray, $R_5$ . . . Incident cone, $R_6$, $R_{6-43}$, $R_{6-44}$, $R_{6-45}$ . . . Emitted cone

The invention claimed is:
1. An optical device comprising:
a first light guiding member that has a first surface, a second surface, a third surface opposed to the first surface, a fourth surface opposed to the second surface, a fifth surface, and a sixth surface opposed to the fifth surface, and internally includes a first deflecting means; and
a second light guiding member that has a seventh surface, an eighth surface, a ninth surface opposed to the seventh surface, a tenth surface opposed to the eighth surface, an eleventh surface, and a twelfth surface opposed to the eleventh surface, and internally includes a second deflecting means,
wherein the first surface and the third surface are parallel with each other,
wherein the second surface and the fourth surface are parallel with each other and orthogonal to the first surface and the third surface,
wherein the seventh surface and the ninth surface are parallel with an XY plane in an XYZ orthogonal coordinate system,
wherein the eighth surface is separated from the third surface by a gap therebetween,
wherein light that enters from the fifth surface is totally reflected within the first light guiding member, is deflected by the first deflecting means, is emitted from the third surface, enters the eighth surface is totally reflected between the seventh surface and the ninth surface, is deflected by the second deflecting means, and is emitted from the seventh surface, wherein the first deflecting means includes a plurality of first semitransparent layers that are separated from each other and are in parallel with each other, wherein α is a first angle formed between a normal to a first semitransparent layer, of the plurality of first semitransparent layers, and an X-axis when the normal to the first semitransparent layer is projected onto an XZ plane, such that a value of α exceeds zero degrees and is less than or equal to 45 degrees, and wherein β is a second angle formed between the normal to the first semitransparent layer and the X-axis when the normal to the first semitransparent layer is projected onto the XY plane, such that a value of β exceeds zero degrees and is less than or equal to 65 degrees.

2. The optical device according to claim 1, wherein the first light guiding member includes a first semitransparent mirror film that is in parallel with the first surface and the third surface, or a second semitransparent mirror film that is in parallel with the second surface and the fourth surface.

3. The optical device according to claim 2, wherein the first semitransparent mirror film that is in parallel with the first surface and the third surface within the first light guiding member is in a part of a region located at equal distances from the first surface and the third surface.

4. The optical device according to claim 2, wherein the first semitransparent mirror film included in the first light guiding member is in parallel with the first surface and the third surface and is in a part of a region on the first surface or in a part of a region on the third surface.

5. The optical device according to claim 2, wherein the second semitransparent mirror film that is in parallel with the second surface and the fourth surface within the first light guiding member is in a part of a region located at equal distances from the second surface and the fourth surface.

6. The optical device according to claim 2, wherein the second semitransparent mirror film included in the first light guiding member is in parallel with the second surface and the fourth surface and is in a part of a region on the second surface or a part of a region on the fourth surface.

7. The optical device according to claim 1, wherein the second light guiding member includes a semitransparent mirror film that is in parallel with the seventh surface and the ninth surface.

8. The optical device according to claim 7, wherein the semitransparent mirror film that is in parallel with the seventh surface and the ninth surface within the second light guiding member is in a part of a region located at equal distances from the seventh surface and the ninth surface.

9. The optical device according to claim 7, wherein the semitransparent mirror film included in the second light guiding member is in parallel with the seventh surface and the ninth surface and is in a part of a region on the seventh surface or a part of a region on the ninth surface.

10. The optical device according to claim 1, further comprising:
a sectional area enlarging portion that enlarges a sectional area of light incident on the fifth surface is included in a vicinity of the fifth surface in the first light guiding member,
wherein the light enters the fifth surface through the sectional area enlarging portion.

11. The optical device according to claim 1, further comprising:
a sectional area enlarging portion that enlarges a sectional area of light incident on the eighth surface is included in a vicinity of the eighth surface in the second light guiding member,
wherein the light enters the eighth surface through the sectional area enlarging portion.

12. The optical device according to claim 1, wherein the second deflecting means includes a plurality of second semitransparent layers that are separated from each other and in parallel with each other.

13. The optical device according to claim 12, wherein each of the plurality of first semitransparent layers includes a dielectric multilayer film, and
each of the plurality of second semitransparent layers includes a dielectric multilayer film.

14. The optical device according to claim 1, wherein a first semitransparent layer located at a position far from the fifth surface among the plurality of first semitransparent layers that constitute the first deflecting means has a higher optical reflectance than another first semitransparent layer located at a position near the fifth surface.

15. The optical device according to claim 1, wherein $$20 \text{ (degrees)} \leq \alpha \leq 30 \text{ (degrees), and}$$

$$55 \text{ (degrees)} \leq \beta \leq 65 \text{ (degrees) are satisfied.}$$

16. The optical device according to claim 1, wherein the third surface and the eighth surface are parallel with each other.

17. An image display device comprising:
an image forming device; and
the optical device according to claim 1.

18. A display device comprising:
a frame mounted on a head of an observer; and
an image display device attached to the frame,
wherein the image display device includes an image forming device and the optical device according to claim 1.

19. The optical device according to claim 1, wherein the first light guiding member includes a first semitransparent mirror film that is in parallel with the first surface and the third surface and a second semitransparent mirror film that is in parallel with the second surface and the fourth surface.

20. An image display device comprising:
an image forming device; and
an optical device,
the optical device including:
a first light guiding member that has a first surface, a second surface, a third surface opposed to the first surface, a fourth surface opposed to the second surface, a fifth surface, and a sixth surface opposed to the fifth surface, and internally includes a first deflecting means, and
a second light guiding member that has a seventh surface, an eighth surface, a ninth surface opposed to the seventh surface, a tenth surface opposed to the eighth surface, an eleventh surface, and a twelfth surface opposed to the eleventh surface, and internally includes a second deflecting means,
wherein the first surface and the third surface are parallel with each other, wherein the second surface and the fourth surface are parallel with each other and orthogonal to the first surface and the third surface, wherein the seventh surface and the ninth surface are parallel with an XY plane in an XYZ orthogonal coordinate system, wherein the eighth surface is separated from the third surface by a gap therebetween, wherein light that enters from the fifth surface is totally reflected within the first light guiding member, is deflected by the first deflecting means, is emitted from the third surface, enters the eighth surface is totally reflected between the seventh surface and the ninth surface, is deflected by the second deflecting means, and is emitted from the seventh surface, wherein the first deflecting means includes a plurality of first semitransparent layers that are separated from each other and in parallel with each other, wherein $\alpha$ is a first angle formed between a normal to a first semitransparent layer, of the plurality of first semitransparent layers, and an X-axis when the normal to the first semitransparent layer is projected onto an XZ plane, such that a value of $\alpha$ exceeds zero degrees and is less than or equal to 45 degrees, and wherein $\beta$ is a second angle formed between the normal to the first semitransparent layer and the X-axis when the normal to the first semitransparent layer is projected onto the XY plane, such that a value of $\beta$ exceeds zero degrees and is less than or equal to 65 degrees.

21. A display device comprising:

a frame mounted on a head of an observer; and an image display device attached to the frame, the image display device includes an image forming device and an optical device, the optical device including:

a first light guiding member that has a first surface, a second surface, a third surface opposed to the first surface, a fourth surface opposed to the second surface, a fifth surface, and a sixth surface opposed to the fifth surface, and internally includes a first deflecting means, and a second light guiding member that has a seventh surface, an eighth surface, a ninth surface opposed to the seventh surface, a tenth surface opposed to the eighth surface, an eleventh surface, and a twelfth surface opposed to the eleventh surface, and internally includes a second deflecting means, wherein the first surface and the third surface are parallel with each other, wherein the second surface and the fourth surface are parallel with each other and orthogonal to the first surface and the third surface, wherein the seventh surface and the ninth surface are parallel with an XY plane in an XYZ orthogonal coordinate system, wherein the eighth surface is separated from the third surface by a gap therebetween, wherein light that enters from the fifth surface is totally reflected within the first light guiding member, is deflected by the first deflecting means, is emitted from the third surface, enters the eighth surface is totally reflected between the seventh surface and the ninth surface, is deflected by the second deflecting means, and is emitted from the seventh surface, wherein the first deflecting means includes a plurality of first semitransparent layers that are separated from each other and are in parallel with each other, wherein $\alpha$ is a first angle formed between a normal to a first semitransparent layer, of the plurality of first semitransparent layers, and an X-axis when the normal to the first semitransparent layer is projected onto an XZ plane, such that a value of $\alpha$ exceeds zero degrees and is less than or equal to 45 degrees, and wherein $\beta$ is a second angle formed between the normal to the first semitransparent layer and the X-axis when the normal to the first semitransparent layer is projected onto the XY plane, such that a value of $\beta$ exceeds zero degrees and is less than or equal to 65 degrees.

\* \* \* \* \*